United States Patent
Kubo et al.

(10) Patent No.: US 9,023,568 B2
(45) Date of Patent: *May 5, 2015

(54) BINDER RESIN FOR TONERS

(75) Inventors: Takashi Kubo, Wakayama (JP); Osamu Yamashita, Wakayama (JP); Norihiro Hirai, Wakayama (JP)

(73) Assignee: Kao Corporation, Tokyo (JP)

( * ) Notice: Subject to any disclaimer, the term of this patent is extended or adjusted under 35 U.S.C. 154(b) by 8 days.

This patent is subject to a terminal disclaimer.

(21) Appl. No.: 13/822,105

(22) PCT Filed: Oct. 26, 2011

(86) PCT No.: PCT/JP2011/074725
§ 371 (c)(1),
(2), (4) Date: Mar. 11, 2013

(87) PCT Pub. No.: WO2012/057233
PCT Pub. Date: May 3, 2012

(65) Prior Publication Data
US 2013/0171555 A1    Jul. 4, 2013

(30) Foreign Application Priority Data

Oct. 27, 2010 (JP) ................. 2010-241223
Mar. 30, 2011 (JP) ................. 2011-075966
Jul. 19, 2011 (JP) ................. 2011-158055

(51) Int. Cl.
G03G 9/00    (2006.01)
G03G 9/087   (2006.01)

(52) U.S. Cl.
CPC ........ *G03G 9/08755* (2013.01); *G03G 9/08791* (2013.01); *G03G 9/08795* (2013.01)

(58) Field of Classification Search
CPC .................. G03G 9/08755; G03G 9/08791
USPC .......................................... 430/109.1, 109.4
See application file for complete search history.

(56) References Cited

U.S. PATENT DOCUMENTS

2006/0292477 A1* 12/2006 Daimon et al. ............ 430/109.4
2010/0174044 A1*  7/2010 Eritate ....................... 528/272
2014/0170547 A1*  6/2014 Farrugia et al. ........... 430/105

FOREIGN PATENT DOCUMENTS

| CN | 101405662 A | 4/2009 |
|---|---|---|
| JP | 2008-291243 | 12/2008 |
| JP | 2008-291244 | 12/2008 |
| JP | 2009-197110 | 9/2009 |
| JP | 2012-207193 | 10/2012 |

OTHER PUBLICATIONS

Machine Translation, Publication No. 2012-107228, Published on Jun. 7, 2012.*
U.S. Appl. No. 13/792,732, filed Mar. 11, 2013, Ashizawa, et al.
International Search Report issued Jan. 31, 2012 in Application No. PCT/JP2011/074725.
Combined Office Action and Search Report issued Jul. 18, 2014 in Chinese Patent Application No. 201180051248.5 (with English translation of Category of Cited Documents).

* cited by examiner

*Primary Examiner* — Thorl Chea
(74) *Attorney, Agent, or Firm* — Oblon, McClelland, Maier & Neustadt, L.L.P.

(57) ABSTRACT

A resin binder for use in a toner, containing an amorphous polyester having a furan ring; and a toner for electrophotography, containing the resin binder. The resin binder for use in a toner of the present invention is suitably used in a toner usable in development of latent images formed in electrophotography, an electrostatic recording method, an electrostatic printing method, or the like.

20 Claims, No Drawings

BINDER RESIN FOR TONERS

CROSS REFERENCES TO RELATED APPLICATIONS

This application is a 371 of International Patent Application No. PCT/JP11/074725, filed on Oct. 26, 2011, and claims priority to Japanese Patent Application No. 2010-241223, filed on Oct. 27, 2010, Japanese Patent Application No. 2011-075966, filed on Mar. 30, 2011, and Japanese Patent Application No. 2011-158055, filed on Jul. 19, 2011.

TECHNICAL FIELD

The present invention relates to a resin binder for use in a toner usable in development of latent images formed in electrophotography, an electrostatic recording method, an electrostatic printing method, or the like, the resin binder containing an amorphous polyester, and a toner for electrophotography containing the resin binder.

BACKGROUND ART

In recent years, with the advancements in speed-up and energy conservation of printers and copy machines, toners having excellent low-temperature fusing ability are even more in demand. However, usually if a resin binder for a toner is formed into a low molecular compound in order to melt the resin at low temperatures, a glass transition temperature of the resin is lowered, thereby lowering in storage property.

In order to overcome this disadvantage, as a resin binder for use in a toner having a high glass transition temperature even at a low molecular weight, polyesters obtained from a carboxylic acid having an aromatic ring such as terephthalic acid or isophthalic acid as a raw material monomer are well used.

On the other hand, Patent Publication 1 discloses, as an objective of providing a thermoplastic resin having excellent heat resistance, mechanical properties, and weathering resistance, and having a sufficient molecular weight, using biomass as a raw material, a thermoplastic resin characterized in that the thermoplastic resin has a furan structure, and that the thermoplastic resin has a reducing viscosity ($\eta sp/C$) of 0.48 dL/g or more and a terminal acid value is less than 200 µeq/g. Also, Patent Publication 2 discloses a method for producing a polyester resin containing a dicarboxylic acid unit having a furan structure.

However, the resins described in Patent Publication 1 and Patent Publication 2 are used mainly in film applications or applications for injection-molded articles, so that the resins have high crystallinity, thereby making them unsuitable as resin binders for use in toners.

In addition, Patent Publication 3 discloses, as an objective of providing a novel polyester resin, which can be used in the production of molded articles having excellent impact resistance, a polyester resin characterized in that the polyester resin has a structural unit of a specified furan ring.

However, the resin described in Patent Publication 3 also is a composition for use in molded articles, so that the resin has a high crystallinity, thereby making it unsuitable as a resin binder for use in a toner.

PRIOR ART REFERENCES

Patent Publications

Patent Publication 1: Japanese Patent Laid-Open No. 2008-291243

Patent Publication 2: Japanese Patent Laid-Open No. 2008-291244

Patent Publication 3: Japanese Patent Laid-Open No. 2009-197110

SUMMARY OF THE INVENTION

The present invention relates to:
[1] a resin binder for use in a toner, the resin binder containing an amorphous polyester having a furan ring; and
[2] a toner for electrophotography, containing the resin binder as defined in the above [1].

DETAILED DESCRIPTION OF THE INVENTION

As a result of studies, the present inventors have found that a resin binder for use in a toner gives the toner excellent low-temperature fusing ability and storage property by making a polyester having a furan ring amorphous.

The present invention relates to a resin binder for use in a toner, which gives the toner excellent low-temperature fusing ability and storage property, and a toner for electrophotography containing the resin binder. Further, the present invention relates to a resin binder for use in a toner, which gives the toner excellent low-temperature fusing ability, storage property, and durability, and a toner for electrophotography containing the resin binder.

The resin binder for use in a toner of the present invention exhibits some excellent effects that both low-temperature fusing ability and storage property of the toner can be satisfied. Further, since a specified aliphatic carboxylic acid compound and/or a specified aliphatic alcohol is used in a raw material monomer for an amorphous polyester, some excellent effects such as the resin binder for use in a toner of the present invention is capable of satisfying both low-temperature fusing ability and storage property of the toner, and further improving durability are exhibited.

The resin binder of the present invention has a great feature in that the resin binder contains an amorphous polyester having a furan ring. The present inventors have found that since a compound having a furan ring is used as a raw material monomer for a polyester, a resin having a high glass transition temperature even if its softening point is low, in other words, a resin having a high glass transition temperature even if a number-average molecular weight is low, is obtained. Accordingly, the resin binder for use in a toner of the present invention gives the toner excellent low-temperature fusing ability and storage property. Although the reasons therefor are not elucidated, it is considered that an amorphous polyester having a furan ring gives the toner excellent low-temperature fusing ability, and at the same time that the amorphous polyester has a structure having low flexibility in which the mobility of the resin is lowered, so that the amorphous polyester also gives the toner excellent storage property.

In the present invention, the crystallinity of the resin is expressed by a ratio of a softening point to a highest temperature of the endothermic peak determined with a differential scanning calorimeter (DSC), i.e., a crystallinity index defined by "softening point/highest temperature of the endothermic peak." Generally, when this crystallinity index exceeds 1.4, the resin is amorphous; and when the crystallinity index is less than 0.6, the resin is low in crystallinity and contains a greater amorphous portion. In the present invention, the "amorphous" resin refers to a resin having a crystallinity index of exceeding 1.4, or less than 0.6. On the other hand, the "crystalline" resin refers to a resin having a crystallinity index of from 0.6 to 1.4.

The "highest temperature of the endothermic peak" refers to a temperature of the peak on the highest temperature side among endothermic peaks observed under the conditions for the method for measurement described in Examples. When a difference between the highest temperature of the endothermic peak and the softening point is within 20° C., the highest temperature of the endothermic peak is defined as a melting point of a crystalline resin (crystalline polyester). When the difference between the highest temperature of the endothermic peak and the softening point exceeds 20° C., the peak is ascribed to a glass transition of an amorphous polyester.

The crystallinity of the resin can be adjusted by the kinds of the raw material monomers and a combination thereof. Specifically, the amorphization can be accelerated by using a carboxylic acid component or alcohol component having a branched structure, or a trivalent or higher polyvalent carboxylic acid component or alcohol component in proper amounts, for example, an alkyl- or alkenylsuccinic acid, an aliphatic diol having a hydroxyl group bonded to a secondary carbon atom, trimellitic acid, trimellitic anhydride, or the like. Also, the crystallization of the resin can be easily accelerated by using an α,ω-linear alkanediol in a proper amount as an alcohol component.

In the present invention, the amorphous polyester is preferably a resin obtained by polycondensing a carboxylic acid component and an alcohol component, wherein at least a carboxylic acid component containing a carboxylic acid compound having a furan ring and/or an alcohol component containing an alcohol having a furan ring is used as a raw material monomer, and the furan ring having a structure represented by the formula (Ia) or (Ib):

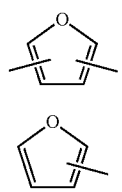

is preferred.

The carboxylic acid compound having a furan ring includes furan dicarboxylic acid compounds such as furan-2,5-dicarboxylic acid, furan-2,4-dicarboxylic acid, furan-2,3-dicarboxylic acid, and furan-3,4-dicarboxylic acid (in the present specification, the carboxylic acid compound includes carboxylic acids, esters formed between the carboxylic acids and alcohols having from 1 to 6 carbon atoms, preferably from 1 to 3 carbon atoms, and acid anhydrides thereof); furan carboxylic acid compounds such as furan-2-carboxylic acid and furan-3-carboxylic acid; the hydroxyfuran carboxylic acid compounds such as 5-hydroxymethyl-furan-2-carboxylic acid; carboxylic acid compounds such as furfuryl acetic acid compounds and 3-carboxy-4-methyl-5-propyl-2-furan propionate (in the present specification, the carboxylic acid compound includes hydroxycarboxylic acid compounds); and the like. Among them, at least one member selected from the group consisting of the furan dicarboxylic acid compounds, the furan carboxylic acid compounds, and the hydroxyfuran carboxylic acid compounds are preferred, from the viewpoint of low-temperature fusing ability and storage property of the toner, and the furan dicarboxylic acid compounds are more preferred, from the viewpoint of storage property of the toner, and furan-2,5-dicarboxylic acid is even more preferred, from the viewpoint of low-temperature fusing ability and storage property of the toner.

The alcohol having a furan ring includes furan di-alcohols such as dihydroxyfuran; hydroxymethyl furfuryl alcohols such as 5-hydroxymethyl furfuryl alcohol; furfuryl alcohols; 5-hydroxymethyl furfural, and the like. Among them, at least one member selected from the group consisting of the furan di-alcohols, the hydroxymethyl furfuryl alcohols, and the furfuryl alcohols is preferred, and at least one member selected from the group consisting of the furan di-alcohols and the hydroxymethyl furfuryl alcohols is more preferred, from the viewpoint of low-temperature fusing ability and storage property of the toner.

The carboxylic acid compound having a furan ring represented by the formula (Ia) includes carboxylic acid compounds such as furan dicarboxylic acid compounds such as furan-2,5-dicarboxylic acid, furan-2,4-dicarboxylic acid, furan-2,3-dicarboxylic acid, and furan-3,4-dicarboxylic acid; hydroxyfuran carboxylic acid compounds such as 5-hydroxymethyl-furan-2-carboxylic acid; and the like.

The alcohol having a furan ring represented by the formula (Ia) includes hydroxymethyl furfuryl alcohols such as 5-hydroxymethyl furfuryl alcohol; furan di-alcohols such as dihydroxyfuran; 5-hydroxymethyl furfural, and the like.

The carboxylic acid compound having a furan ring represented by the formula (Ib) includes furan carboxylic acid compounds such as furan-2-carboxylic acid and furan-3-carboxylic acid; furfuryl acetic acid compounds; and the like.

The alcohol having a furan ring represented by the formula (Ib) includes furfuryl alcohol and the like.

Among the carboxylic acid compounds and the alcohols mentioned above, the carboxylic acid compound and the alcohol each having a furan ring represented by the formula (Ia) are preferred, the furan dicarboxylic acid compounds and the furan di-alcohols are more preferred, and the furan dicarboxylic acid compounds are even more preferred, from the viewpoint of low-temperature fusing ability and storage property of the toner.

The carboxylic acid compound having a furan ring and the alcohol having a furan ring are contained in a total amount of preferably from 10 to 100% by mol, more preferably from 10 to 95% by mol, even more preferably from 20 to 90% by mol, still even more preferably from 20 to 80% by mol, still even more preferably from 30 to 70% by mol, still even more preferably from 40 to 60% by mol, and still even more preferably from 40 to 50% by mol, of the total amount of the carboxylic acid component and the alcohol component, from the viewpoint of low-temperature fusing ability and storage property of the toner.

Further, the carboxylic acid compound having a furan ring is contained in an amount of preferably from 10 to 100% by mol, more preferably from 20 to 100% by mol, even more preferably from 30 to 100% by mol, still even more preferably from 60 to 100% by mol, still even more preferably from 80 to 100% by mol, still even more preferably from 90 to 100% by mol, and still even more preferably substantially 100%, of the carboxylic acid component, from the viewpoint of low-temperature fusing ability and storage property of the toner. The furan dicarboxylic acid compound is contained in an amount of preferably from 10 to 100% by mol, more preferably from 20 to 100% by mol, even more preferably from 30 to 100% by mol, still even more preferably from 60 to 100% by mol, still even more preferably from 80 to 100% by mol, still even more preferably from 90 to 100% by mol, and still even more preferably substantially 100%, of the carboxylic acid component, from the viewpoint of low-temperature fusing ability and storage property of the toner.

The alcohol having a furan ring is contained in an amount of preferably from 10 to 100% by mol, more preferably from 10 to 90% by mol, more preferably from 20 to 90% by mol, even more preferably from 20 to 80% by mol, and still even more preferably from 20 to 40% by mol, of the alcohol component, from the viewpoint of low-temperature fusing ability and storage property of the toner.

In addition, as the carboxylic acid component, two or more kinds of carboxylic acid compounds having a furan ring may be used, and as the alcohol component, two or more kinds of alcohols having a furan ring may be used. One kind of the carboxylic acid compound having a furan ring is contained in an amount of preferably from 10 to 100% by mol, more preferably from 20 to 100% by mol, even more preferably from 30 to 100% by mol, still even more preferably from 60 to 100% by mol, still even more preferably from 90 to 100% by mol, and still even more preferably substantially 100%, of the carboxylic acid component, from the viewpoint of low-temperature fusing ability and storage property of the toner. One kind of the alcohol having a furan ring is contained in an amount of preferably from 10 to 100% by mol, more preferably from 20 to 90% by mol, even more preferably from 20 to 80% by mol, and still even more preferably from 20 to 40% by mol, of the alcohol component. Here, one kind refers to a structural kind, and those having different structural formulas even with the same compositional formula would be regarded as different kinds.

As the alcohol component other than the alcohol having a furan ring, the aliphatic diol is preferred, from the viewpoint of low-temperature fusing ability of the toner. The number of carbon atoms of the aliphatic diol is preferably from 2 to 10, more preferably from 3 to 8, and even more preferably from 3 to 6, from the viewpoint of low-temperature fusing ability of the toner.

The aliphatic diol includes ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-butenediol, neopentyl glycol, 2,3-butanediol, 2,3-pentanediol, 2,4-pentanediol, 2,3-hexanediol, 3,4-hexanediol, 2,4-hexanediol, 2,5-hexanediol, and the like.

Among them, an aliphatic diol having a hydroxyl group bonded to a secondary carbon atom is preferred, from the viewpoint of further lowering the mobility of the resin together with the furan ring, thereby improving storage property of the toner, and at the same time accelerating amorphization of the resin, thereby improving low-temperature fusing ability. The aliphatic diol has preferably from 3 to 8 carbon atoms, and more preferably from 3 to 6 carbon atoms, from the viewpoint of low-temperature fusing ability and storage property. Specific preferred examples include 1,2-propanediol, 1,2-butanediol, 1,3-butanediol, 2,3-butanediol, 1,2-pentanediol, 1,3-pentanediol, 2,3-pentanediol, 2,4-pentanediol, and the like. Among them, 1,2-propanediol and 2,3-butanediol are preferred, and 1,2-propanediol is more preferred, from the viewpoint of storage property.

The aliphatic diol is contained in an amount of preferably from 10 to 100% by mol, more preferably from 20 to 100% by mol, even more preferably from 30 to 100% by mol, still even more preferably from 50 to 100% by mol, still even more preferably from 60 to 100% by mol, still even more preferably from 80 to 100% by mol, and still even more preferably from 90 to 100% by mol, and still even more preferably substantially 100%, of the alcohol component other than the alcohol having a furan ring, from the viewpoint of low-temperature fusing ability of the toner. The aliphatic diol having a hydroxyl group bonded to a secondary carbon atom is contained in an amount of preferably from 10 to 100% by mol, more preferably from 20 to 100% by mol, even more preferably from 30 to 100% by mol, still even more preferably from 50 to 100% by mol, still even more preferably from 60 to 100% by mol, still even more preferably from 80 to 100% by mol, still even more preferably from 90 to 100% by mol, and still even more preferably substantially 100% by mol, of the alcohol component other than the alcohol having a furan ring, from the viewpoint of low-temperature fusing ability and storage property of the toner.

In a case where the alcohol component contains an alcohol having a furan ring, an aliphatic diol/alcohol having a furan ring (molar ratio) is preferably from 0 to 10, more preferably from 0.1 to 8, and even more preferably from 0.2 to 5, from the viewpoint of low-temperature fusing ability and storage property of the toner.

As the alcohol component other than these, an aromatic alcohol is preferred, from the viewpoint of storage property of the toner.

As the aromatic alcohol, a propylene oxide adduct of bisphenol A represented by the formula (II):

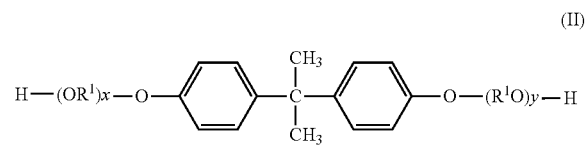

(II)

wherein $R^1O$ and $OR^1$ are an oxyalkylene group, wherein $R^1$ is an ethylene group and/or a propylene group; and each of x and y is a positive number showing the number of moles of alkylene oxide added, wherein an average number of the sum of x and y is preferably from 1 to 16, more preferably from 1 to 8, and even more preferably from 1.5 to 4, is preferred, from the viewpoint of storage property of the toner.

Specific examples of the alkylene oxide adduct of bisphenol A represented by the formula (II) include an alkylene oxide adduct of bisphenol A, such as a polyoxypropylene adduct of 2,2-bis(4-hydroxyphenyl)propane and a polyoxyethylene adduct of 2,2-bis(4-hydroxyphenyl)propane, and the like.

The alkylene oxide adduct of bisphenol A is contained in an amount of preferably from 10 to 100% by mol, more preferably from 20 to 100% by mol, even more preferably from 30 to 100% by mol, still even more preferably from 50 to 100% by mol, still even more preferably from 80 to 100% by mol, and still even more preferably substantially 100%, of the alcohol component other than the alcohol having a furan ring, from the viewpoint of storage property of the toner and acceleration of the amorphization of the resin.

In the present invention, it is preferable that the alcohol component contains trihydric or higher polyhydric alcohols, preferably glycerol, pentaerythritol, and trimethylolpropane, and more preferably glycerol, from the viewpoint of more amorphizing the resin, thereby increasing low-temperature fusing ability and durability of the toner. The trihydric or higher polyhydric alcohol is contained in an amount of preferably from 0.1 to 30% by mol, more preferably from 1 to 25% by mol, and even more preferably from 5 to 25% by mol, of the alcohol component, from the viewpoint of increasing low-temperature fusing ability and durability of the toner. In addition, when the amorphous polyester is combined with a crystalline polyester described later, the trihydric or higher polyhydric alcohol is contained in an amount of preferably from 0 to 10% by mol, more preferably from 0 to 5% by mol, and even more preferably from 0 to 3% by mol, from the viewpoint of durability.

As the carboxylic acid component other than the carboxylic acid compound having a furan ring, an aromatic dicarboxylic acid compound or an aliphatic dicarboxylic acid compound is preferred. In the present invention, carboxylic acids, derivatives such as acid anhydrides and alkyl(1 to 6 carbon atoms) esters and the like are collectively referred to as a carboxylic acid compound.

The aromatic dicarboxylic acid compound is preferred, from the viewpoint of triboelectric chargeability, low-temperature fusing ability, and storage property of the toner.

The aromatic dicarboxylic acid compound includes phthalic acid, isophthalic acid, terephthalic acid, acid anhydrides thereof, alkyl(1 to 6 carbon atoms) esters thereof, and the like.

The aromatic dicarboxylic acid compound is contained in an amount of preferably from 20 to 100% by mol, more preferably from 20 to 80% by mol, even more preferably from 30 to 80% by mol, and still even more preferably from 40 to 60% by mol, of the carboxylic acid component other than the carboxylic acid compound having a furan ring, from the viewpoint of low-temperature fusing ability and storage property of the toner.

In a case where the carboxylic acid component contains a carboxylic acid compound having a furan ring, an aromatic dicarboxylic acid compound/carboxylic acid compound having a furan ring (molar ratio) is preferably from 0 to 10, more preferably from 0.1 to 8, and even more preferably from 0.2 to 5, from the viewpoint of low-temperature fusing ability and storage property of the toner.

The aliphatic dicarboxylic acid compound is preferred, from the viewpoint of low-temperature fusing ability. The aliphatic dicarboxylic acid compound has preferably from 2 to 10 carbon atoms, and more preferably 3 to 9 carbon atoms.

The aliphatic dicarboxylic acid compound includes oxalic acid, malonic acid, maleic acid, fumaric acid, citraconic acid, itaconic acid, glutaconic acid, succinic acid, adipic acid, sebacic acid, azelaic acid, acid anhydrides thereof, and alkyl(1 to 6 carbon atoms) esters thereof, and the like.

The above-mentioned aliphatic dicarboxylic acid compound is contained in an amount of preferably from 20 to 100% by mol, more preferably from 20 to 80% by mol, and even more preferably from 30 to 80% by mol, of the carboxylic acid component other than the carboxylic acid compound having a furan ring, from the viewpoint of low-temperature fusing ability of the toner.

In a case where the carboxylic acid component contains a carboxylic acid compound having a furan ring, an aliphatic dicarboxylic acid compound/carboxylic acid compound having a furan ring (molar ratio) is preferably from 0 to 10, more preferably from 0 to 8, and even more preferably from 0 to 5, from the viewpoint of low-temperature fusing ability and storage property of the toner.

In the present invention, it is preferable that the raw material monomer for the amorphous polyester contains a hydroxycarboxylic acid compound having a total number of hydroxy group or groups and carboxyl group or groups of 3 or more, from the viewpoint of improving storage property and durability of the toner.

The above-mentioned hydroxycarboxylic acid compound is preferably an aliphatic hydroxycarboxylic acid compound, from the viewpoint of more amorphizing the resin and at the same time increasing the molecular weight of the resin, thereby increasing the low-temperature fusing ability of the toner, and a total number of hydroxy group or groups and carboxyl group or groups is 3 or more, preferably 4 or more, more preferably from 3 to 6, and even more preferably from 4 to 5, from the viewpoint of excellent low-temperature fusing ability and durability of the toner. The number of carboxyl group or groups in one molecule is preferably 2 or more, more preferably from 2 to 4, and even more preferably from 2 to 3, from the viewpoint of durability of the toner. The number of hydroxy group or groups in one molecule is preferably from 1 to 3, and more preferably from 1 to 2, from the viewpoint of durability of the toner. A ratio of the number of carboxyl group or groups to the number of hydroxy group or groups of one molecule, i.e. the number of carboxyl group or groups/the number of hydroxy group or groups, preferably 1 or more, preferably from 1 to 4, and more preferably from 1 to 3, from the viewpoint of durability of the toner. Here, the hydroxycarboxylic acid compound at least contains one or more each of the hydroxy group or groups and carboxyl group or groups.

The number of carbon atoms of the above-mentioned hydroxycarboxylic acid compound is preferably 3 or more, more preferably from 4 to 10, and even more preferably from 4 to 8, from the viewpoint of low-temperature fusing ability and durability of the toner.

Specific examples include malic acid (4 carbon atoms: carboxyl groups 2, hydroxy groups 1), tartaric acid (4 carbon atoms: carboxyl groups 2, hydroxy groups 2), citric acid (6 carbon atoms: carboxyl groups 3, hydroxy group 1), isocitric acid (6 carbon atoms: carboxyl groups 3, hydroxy group 1), gluconic acid (6 carbon atoms: carboxyl group 1, hydroxy groups 5), and the like, and it is preferable that the hydroxycarboxylic acid is tartaric acid or citric acid, from the viewpoint of low-temperature fusing ability and durability of the toner. The hydroxycarboxylic acid compound having a total number of hydroxy group or groups and carboxyl group or groups of 3 or more is contained in an amount of preferably from 0.5 to 80% by mol, more preferably from 1 to 50% by mol, and even more preferably from 2 to 30% by mol, of the carboxylic acid component, from the viewpoint of excellent low-temperature fusing ability and durability of the toner. Here, the hydroxycarboxylic acid compounds are included in the carboxylic acid component.

In the present invention, it is desired that the carboxylic acid component contains a tricarboxylic or higher polycarboxylic acid compound, such as trimellitic acid or pyromellitic acid, preferably a trimellitic acid compound, and more preferably trimellitic anhydride, from the viewpoint of more amorphizing the resin, thereby increasing low-temperature fusing ability, durability and storage property of the toner. The tricarboxylic or higher polycarboxylic acid compound is contained in an amount of preferably from 0.1 to 30% by mol, more preferably from 5 to 28% by mol, even more preferably from 20 to 28% by mol, and even more preferably from 23 to 28% by mol, of the carboxylic acid component, from the viewpoint of durability and storage property of the toner. In addition, in a case where the amorphous polyester is combined with a crystalline polyester described later, the tricarboxylic or higher polycarboxylic acid compound is contained in an amount of preferably from 0 to 10% by mol, more preferably from 0 to 5% by mol, and even more preferably from 0 to 3% by mol, of the carboxylic acid component, from the viewpoint of low-temperature fusing ability of the toner.

In a case where the carboxylic acid component contains a carboxylic acid compound having a furan ring, a tricarboxylic or higher polycarboxylic acid compound/carboxylic acid compound having a furan ring (molar ratio) is preferably from 0 to 1, more preferably from 0 to 0.8, and even more preferably from 0 to 0.5, from the viewpoint of increasing low-temperature fusing ability, durability and storage property of the toner.

Other carboxylic acid compounds include alicyclic dicarboxylic acids such as cyclohexanedicarboxylic acid; rosins; rosins modified with fumaric acid, maleic acid, acrylic acid, or the like.

Here, the alcohol component may properly contain a monohydric alcohol, and the carboxylic acid component may properly contain a monocarboxylic acid compound, from the viewpoint of adjustment in molecular weight and improvement in offset resistance.

The molar ratio of the carboxylic acid component to the alcohol component, i.e. the carboxylic acid component/the alcohol component, is preferably from 0.4 to 1.3, more preferably from 0.75 to 1.3, even more preferably from 0.8 to 1.3, and still even more preferably from 0.8 to 1.0. In addition, in a case where the amorphous polyester is combined with a crystalline polyester described later, the molar ratio of the carboxylic acid component to the alcohol component, i.e. the carboxylic acid component/the alcohol component, is preferably from 0.7 to 1.5, and more preferably from 0.7 to 1.4.

Further, it is preferable that the amorphous polyester of the present invention having a furan ring is an amorphous polyester obtained using as a raw material monomer an aliphatic carboxylic acid compound having 6 to 40 carbon atoms and/or an aliphatic alcohol having 6 to 40 carbon atoms. The present inventors have found that the durability of the toner is remarkably improved by using as a raw material monomer an aliphatic carboxylic acid compound having 6 to 40 carbon atoms and/or an aliphatic alcohol having 6 to 40 carbon atoms. Although the reasons therefor are not yet elucidated, it is considered that the aliphatic carboxylic acid compound having 6 to 40 carbon atoms and/or the aliphatic alcohol having 6 to 40 carbon atoms serves to improve dispersibility of a wax, which consequently improves durability of the toner, and at the same time the compound lowers a glass transition temperature, thereby lowering storage property of the toner. However, since the above-mentioned amorphous polyester having a furan ring has a rigid structure, it is considered that the lowering of a glass transition temperature is suppressed even when an aliphatic carboxylic acid compound having 6 to 40 carbon atoms and/or an aliphatic alcohol having 6 to 40 carbon atoms is used in an effective amount, so that both storage property and durability of the toner are satisfied.

Therefore, in the present invention, the amorphous polyester having a furan ring, as mentioned above, is a resin obtained from a carboxylic acid component and an alcohol component as raw material monomers, and polycondensing these components, and it is preferable that at least one of the carboxylic acid component and the alcohol component is a carboxylic acid component containing an aliphatic carboxylic acid compound having 6 to 40 carbon atoms and/or an alcohol component containing an aliphatic alcohol having 6 to 40 carbon atoms.

The aliphatic carboxylic acid compound having 6 to 40 carbon atoms is preferably a linear or branched monocarboxylic or dicarboxylic acid compound, from the viewpoint of durability and storage property of the toner. When the number of carbon atoms is less than 6, durability of the toner is lowered, and when the number of carbon atoms exceeds 40, storage property of the toner is lowered. In addition, the number of carbon atoms is preferably 6 or more, more preferably 8 or more, and even more preferably 12 or more, from the viewpoint of durability of the toner, and the number of carbon atoms is preferably 40 or less, more preferably 36 or less, even more preferably 26 or less, still even more preferably 22 or less, and still even more preferably 16 or less, from the viewpoint of storage property. Therefore, the number of carbon atoms is from 6 to 40, preferably from 8 to 36, more preferably from 12 to 26, even preferably from 12 to 22, and still even more preferably from 12 to 16, from the viewpoint of storage property and durability of the toner. Here, in the present invention, the number of carbon atoms of the carboxylic acid compound is the number of carbon atoms including the number of carbon atoms of the carboxyl group, but does not include the number of carbon atoms of the alkyl group in the alkyl ester. In addition, in the present invention, carboxylic acids, derivatives such as acid anhydrides and alkyl(1 to 3 carbon atoms) esters and the like are collectively referred to as a carboxylic acid compound.

Specific examples of the linear or branched, monocarboxylic acid compound include hexanoic acid, heptanoic acid, octanoic acid, nonanoic acid, decanoic acid, dodecanoic acid, lauric acid, stearic acid, myristic acid, palmitic acid, arachidic acid, behenic acid, lignoceric acid, linolenic acid, linoleic acid, oleic acid, acid anhydrides thereof, alkyl(1 to 3 carbon atoms) esters thereof, and the like.

Specific examples of the linear or branched, dicarboxylic acid compound include alkylsuccinic or alkenylsuccinic acids (hereinafter simply referred to as succinic acid derivatives), of which alkyl group has preferably from 8 to 22 carbon atoms, more preferably from 8 to 18 carbon atoms, and even more preferably from 8 to 14 carbon atoms, or of which alkenyl group has preferably from 8 to 22 carbon atoms, more preferably from 8 to 18 carbon atoms, and even more preferably from 8 to 14 carbon atoms, adipic acid, pentanedicarboxylic acid, hexanedicarboxylic acid, heptanedicarboxylic acid, sebacic acid, nonanedicarboxylic acid, decanedicarboxylic acid, dodecanedicarboxylic acid, dimer acids in which unsaturated aliphatic acids having 8 to 18 carbon atoms are dimerized, acid anhydrides thereof, alkyl(1 to 3 carbon atoms) esters thereof, and the like.

Among the aliphatic carboxylic acid compounds having 6 to 40 carbon atoms mentioned above, the succinic acid derivatives, sebacic acid, and the dimer acids are preferred, from the viewpoint of low-temperature fusing ability and durability of the toner, and the succinic acid derivatives are more preferred, from the viewpoint of low-temperature fusing ability, durability, and storage property of the toner. The aliphatic carboxylic acid compound having 6 to 40 carbon atoms is contained, preferably the succinic acid derivatives are contained, in an amount of preferably 2% by mol or more, more preferably 4% by mol or more, even more preferably 6% by mol or more, and still even more preferably 10% by mol or more, of the carboxylic acid component, from the viewpoint of low-temperature fusing ability and durability of the toner, and the aliphatic carboxylic acid compound is contained in an amount of preferably 75% by mol or less, more preferably 60% by mol or less, even more preferably 50% by mol or less, still even more preferably 40% by mol or less, and still even more preferably 30% by mol or less, of the carboxylic acid component, from the viewpoint of low-temperature fusing ability and storage property of the toner. Therefore, the aliphatic carboxylic acid compound is contained in an amount of preferably from 2 to 75% by mol, more preferably from 4 to 60% by mol, even more preferably from 6 to 50% by mol, still even more preferably from 6 to 40% by mol, and still even more preferably from 10 to 30% by mol, from the viewpoint of low-temperature fusing ability, storage property and durability of the toner.

The aliphatic alcohol having 6 to 40 carbon atoms is preferably a linear or branched, mono-alcohol or di-alcohol, from the viewpoint of storage property and durability of the toner. When the number of carbon atoms is less than 6, durability of the toner is lowered, and when the number of carbon atoms exceeds 40, storage property of the toner is lowered. In addition, the number of carbon atoms is preferably 6 or more; more preferably 8 or more, and even more preferably 12 or more, from the viewpoint of durability of the toner, and the number of carbon atoms is preferably 40 or less, more preferably 36 or less, even more preferably 26 or less, still even more preferably 22 or less, and still even more preferably 16 or less, from the viewpoint of storage property. Therefore, the number of carbon atoms is from 6 to 40, preferably from 8 to 36, more preferably from 12 to 26, even preferably from 12 to 22, and still even more preferably from 12 to 16, from the viewpoint of storage property and durability of the toner.

Specific examples of the linear or branched, mono-alcohol include hexanol, heptanol, octanol, nonanol, decanol, dodecanol, lauryl alcohol, myristyl alcohol, cetyl alcohol, stearyl alcohol, oleyl alcohol, linoleyl alcohol, and the like.

Specific examples of the linear or branched, di-alcohol include hexanediol, heptanediol, octanediol, nonanediol, decanediol, dodecanediol, dimer-diol, and the like.

The aliphatic alcohol having 6 to 40 carbon atoms is contained in an amount of preferably 2% by mol or more, more preferably 4% by mol or more, even more preferably 6% by mol or more, and still even more preferably 10% by mol or more, of the alcohol component, from the viewpoint of low-temperature fusing ability and durability of the toner, and the aliphatic alcohol is contained in an amount of preferably 75% by mol or less, more preferably 60% by mol or less, even more preferably 50% by mol or less, still even more preferably 40% by mol or less, and still even more preferably 30% by mol or less, of the alcohol component, from the viewpoint of low-temperature fusing ability and storage property of the toner. Therefore, the aliphatic alcohol is contained in an amount of preferably from 2 to 75% by mol, more preferably from 4 to 60% by mol, even more preferably from 6 to 50% by mol, still even more preferably from 6 to 40% by mol, and still even more preferably from 10 to 30% by mol, from the viewpoint of low-temperature fusing ability, storage property and durability of the toner.

The aliphatic carboxylic acid compound having 6 to 40 carbon atoms and the aliphatic alcohol having 6 to 40 carbon atoms are contained in a total amount of preferably 1% by mol or more, more preferably 2% by mol or more, even more preferably 3% by mol or more, and still even more preferably 5% by mol or more, of the total amount of the carboxylic acid component and the alcohol component, from the viewpoint of low-temperature fusing ability and durability of the toner, and is contained in a total amount of preferably 35% by mol or less, more preferably 30% by mol or less, even more preferably 20% by mol or less, and still even more preferably 15% by mol or less, of the total amount of the carboxylic acid component and the alcohol component, from the viewpoint of low-temperature fusing ability and storage property of the toner. Therefore, the aliphatic carboxylic acid compound and the aliphatic alcohol are contained in a total amount of preferably from 1 to 35% by mol, more preferably from 2 to 30% by mol, even more preferably from 3 to 20% by mol, and still even more preferably from 5 to 15% by mol, from the viewpoint of low-temperature fusing ability, storage property and durability of the toner.

The molar ratio of [total amount of the aliphatic carboxylic acid compound having 6 to 40 carbon atoms and the aliphatic alcohol having 6 to 40 carbon atoms]/[total amount of the carboxylic acid compound having a furan ring and the alcohol having a furan ring described later] is preferably 0.03 or more, more preferably 0.05 or more, even more preferably 0.1 or more, and still even more preferably 0.2 or more, from the viewpoint of low-temperature fusing ability and durability of the toner, and the molar ratio is preferably 5 or less, more preferably 3 or less, even more preferably 2 or less, and still even more preferably 1 or less, from the viewpoint of low-temperature fusing ability and storage property of the toner. Therefore, the molar ratio is preferably from 0.03 to 5, more preferably from 0.05 to 5, even more preferably from 0.1 to 3, still even more preferably from 0.1 to 2, and still even more preferably from 0.2 to 1, from the viewpoint of low-temperature fusing ability, storage property and durability of the toner.

In addition, the molar ratio of the succinic acid derivative/the carboxylic acid compound having a furan ring is preferably 0.03 or more, more preferably 0.05 or more, even more preferably 0.1 or more, and still even more preferably 0.2 or more, from the viewpoint of low-temperature fusing ability and durability of the toner, and the molar ratio is preferably 5 or less, more preferably 3 or less, even more preferably 2 or less, and still even more preferably 1 or less, from the viewpoint of low-temperature fusing ability and storage property of the toner. Therefore, the molar ratio is preferably from 0.03 to 5, more preferably from 0.05 to 5, even more preferably from 0.1 to 3, still even more preferably from 0.1 to 2, and still even more preferably from 0.2 to 1, from the viewpoint of low-temperature fusing ability, storage property and durability of the toner.

In the amorphous polyester obtained using as a raw material monomer an aliphatic carboxylic acid compound having 6 to 40 carbon atoms and/or an aliphatic alcohol having 6 to 40 carbon atoms, the carboxylic acid compound having a furan ring and the alcohol having a furan ring are contained in a total amount of preferably from 10 to 95% by mol, more preferably from 15 to 75% by mol, even more preferably from 20 to 50% by mol, and still even more preferably from 25 to 40% by mol, of the total amount of the carboxylic acid component and the alcohol component, from the viewpoint of low-temperature fusing ability, storage property, and durability of the toner.

Further, the carboxylic acid compound having a furan ring is contained in an amount of preferably from 10 to 100% by mol, more preferably from 20 to 96% by mol, even more preferably from 20 to 90% by mol, still even more preferably from 30 to 90% by mol, still even more preferably from 30 to 80% by mol, and still even more preferably from 60 to 80% by mol, of the carboxylic acid component, from the viewpoint of low-temperature fusing ability, storage property, and durability of the toner, and the furan dicarboxylic acid compound is contained in an amount of preferably from 10 to 100% by mol, more preferably from 20 to 96% by mol, even more preferably from 20 to 90% by mol, still even more preferably from 30 to 90% by mol, still even more preferably from 30 to 80% by mol, and still even more preferably from 60 to 80% by mol, of the carboxylic acid component, from the viewpoint of low-temperature fusing ability, storage property, and durability of the toner.

The alcohol having a furan ring is contained in an amount of preferably from 10 to 100% by mol, more preferably from 20 to 96% by mol, even more preferably from 20 to 90% by mol, and still even more preferably from 30 to 80% by mol, of the alcohol component, from the viewpoint of low-temperature fusing ability, storage property, and durability of the toner.

In addition, from the viewpoint of low-temperature fusing ability, storage property, and durability of the toner, one kind of the carboxylic acid compound having a furan ring is contained in an amount of preferably from 10 to 100% by mol, more preferably from 20 to 96% by mol, even more preferably from 20 to 90% by mol, still even more preferably from 30 to 80% by mol, and still even more preferably from 60 to 80% by mol, of the carboxylic acid component, and one kind of the alcohol having a furan ring is contained in an amount of preferably from 10 to 100% by mol, more preferably from 20 to 96% by mol, even more preferably from 20 to 90% by mol, and still even more preferably from 30 to 80% by mol, of the alcohol component. Here, one kind refers to a structural kind, and those having different structural formulas even with the same compositional formula would be regarded as different kinds.

As the alcohol component other than the alcohol having a furan ring and the aliphatic alcohol having 6 to 40 carbon atoms, an aliphatic diol having 2 to 5 carbon atoms is preferred, and an aliphatic diol having 3 to 4 carbon atoms is more preferred, from the viewpoint of low-temperature fusing ability of the toner.

The aliphatic diol having 2 to 5 carbon atoms includes ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,4-butenediol, 2,3-butanediol, 2,3-pentanediol, 2,4-pentanediol, and the like.

Among them, an aliphatic diol having 3 to 5 carbon atoms, having a hydroxyl group bonded to a secondary carbon atom is preferred, from the viewpoint of further lowering the mobility of the resin together with the furan ring, thereby improving storage property of the toner, and at the same time accelerating amorphization of the resin, thereby improving low-temperature fusing ability. The aliphatic diol has more preferably from 3 to 4 carbon atoms, from the viewpoint of low-temperature fusing ability and storage property. Specific examples include 1,2-propanediol, 1,2-butanediol, 1,3-butanediol, 2,3-butanediol, and the like. Among them, 1,2-propanediol and 2,3-butanediol are preferred, and 1,2-propanediol is more preferred, from the viewpoint of low-temperature fusing ability, storage property, and durability of the toner.

The aliphatic diol having 2 to 5 carbon atoms is contained in an amount of preferably from 10 to 100% by mol, more preferably from 20 to 100% by mol, even more preferably from 30 to 100% by mol, still even more preferably from 50 to 100% by mol, still even more preferably from 90 to 100% by mol, and still even more preferably substantially 100% by mol, of the alcohol component other than the alcohol having a furan ring and the aliphatic alcohol having 6 to 40 carbon atoms, from the viewpoint of low-temperature fusing ability of the toner, and the aliphatic diol having 3 to 5 carbon atoms, having a hydroxyl group bonded to a secondary carbon atom is contained in an amount of preferably from 10 to 100% by mol, more preferably from 20 to 100% by mol, even more preferably from 30 to 100% by mol, still even more preferably from 50 to 100% by mol, still even more preferably from 90 to 100% by mol, and still even more preferably substantially 100% by mol, of the alcohol component, from the viewpoint of low-temperature fusing ability and storage property of the toner.

In a case where the alcohol component contains an alcohol having a furan ring, an aliphatic diol having 2 to 5 carbon atoms/alcohol having a furan ring (molar ratio) is preferably from 0 to 10, more preferably from 0.1 to 8, and even more preferably from 0.2 to 5, from the viewpoint of low-temperature fusing ability and storage property of the toner.

As the alcohol component other than these, an aromatic alcohol is preferred, from the viewpoint of storage property of the toner.

As the aromatic alcohol, the alkylene oxide adduct of bisphenol A represented by the formula (II) mentioned above is preferred, from the viewpoint of storage property of the toner.

The alkylene oxide adduct of bisphenol A is contained in an amount of preferably from 10 to 100% by mol, more preferably from 20 to 100% by mol, even more preferably from 30 to 100% by mol, still even more preferably from 50 to 100% by mol, still even more preferably from 90 to 100% by mol, and still even more preferably substantially 100% by mol, of the alcohol component other than the alcohol having a furan ring and the aliphatic alcohol having 6 to 40 carbon atoms, from the viewpoint of storage property of the toner.

In the present invention, the alcohol component may contain a trihydric or higher polyhydric alcohol having 3 to 5 carbon atoms, from the viewpoint of accelerating amorphization of the resin, thereby increasing low-temperature fusing ability and durability of the toner. The trihydric or higher polyhydric alcohol having 3 to 5 carbon atoms is preferably glycerol, pentaerythritol, or the like, and more preferably glycerol. The trihydric or higher polyhydric alcohol having 3 to 5 carbon atoms is contained in an amount of preferably from 0.1 to 30% by mol, more preferably from 1 to 25% by mol, and even more preferably from 5 to 25% by mol, of the alcohol component, from the viewpoint of increasing low-temperature fusing ability and durability of the toner.

As the carboxylic acid component other than the carboxylic acid compound having a furan ring and the aliphatic carboxylic acid compound having 6 to 40 carbon atoms, an aromatic dicarboxylic acid compound or an aliphatic dicarboxylic acid compound having 2 to 5 carbon atoms is preferred.

The aromatic dicarboxylic acid compound is preferred, from the viewpoint of triboelectric chargeability and storage property of the toner.

The aromatic dicarboxylic acid compound includes phthalic acid, isophthalic acid, terephthalic acid, acid anhydrides thereof, alkyl(1 to 5 carbon atoms) esters thereof, and the like.

The aromatic dicarboxylic acid compound is contained in an amount of preferably from 10 to 100% by mol, more preferably from 20 to 100% by mol, even more preferably from 50 to 100% by mol, even more preferably from 90 to 100% by mol, and even more preferably substantially 100% by mol, of the carboxylic acid component other than the carboxylic acid compound having a furan ring and the aliphatic carboxylic acid compound having 6 to 40 carbon atoms, from the viewpoint of triboelectric chargeability of the toner.

In a case where the carboxylic acid component contains a carboxylic acid compound having a furan ring, an aromatic dicarboxylic acid compound/carboxylic acid compound having a furan ring (molar ratio) is preferably from 0 to 10, more preferably from 0.1 to 8, and even more preferably from 0.2 to 5, from the viewpoint of triboelectric chargeability and storage property of the toner.

The aliphatic dicarboxylic acid compound having 2 to 5 carbon atoms is preferred, and more preferably 2 to 4 carbon atoms, from the viewpoint of low-temperature fusing ability.

The aliphatic dicarboxylic acid compound having 2 to 5 carbon atoms includes oxalic acid, malonic acid, maleic acid, fumaric acid, citraconic acid, itaconic acid, succinic acid, acid anhydrides thereof, and alkyl(1 to 3 carbon atoms) esters thereof, and the like.

The aliphatic dicarboxylic acid compound having 2 to 5 carbon atoms is contained in an amount of preferably from 10 to 100% by mol, more preferably from 20 to 100% by mol, even more preferably from 50 to 100% by mol, even more preferably from 90 to 100% by mol, and even more preferably substantially 100% by mol, of the carboxylic acid component other than the carboxylic acid compound having a furan ring and the aliphatic carboxylic acid compound having 6 to 40 carbon atoms, from the viewpoint of low-temperature fusing ability of the toner.

In the present invention, it is preferable that the carboxylic acid component contains a tricarboxylic or higher polycarboxylic acid compound having 3 to 5 carbon atoms, from the viewpoint of accelerating amorphization of the resin, thereby increasing low-temperature fusing ability, durability, and storage property of the toner. The tricarboxylic or higher polycarboxylic acid compound having 3 to 5 carbon atoms is preferably trimellitic acid, pyromellitic acid or the like, preferably a trimellitic acid compound, and more preferably trimellitic anhydride. The tricarboxylic or higher polycarboxylic acid compound having 3 to 5 carbon atoms is contained in an amount of preferably from 0.1 to 40% by mol, more preferably from 1 to 30% by mol, more preferably from 5 to 28% by mol, even more preferably from 20 to 28% by mol, and even more preferably from 23 to 28% by mol, of the carboxylic acid component, from the viewpoint of durability and storage property of the toner.

Other carboxylic acid compounds include alicyclic dicarboxylic acids such as cyclohexanedicarboxylic acid; rosins; rosins modified with fumaric acid, succinic acid, maleic acid, or acrylic acid; and the like.

Here, the alcohol component may contain a monohydric alcohol having 5 or less carbon atoms, if necessary, and the carboxylic acid component may contain a monocarboxylic acid compound having 5 or less carbon atoms, if necessary, from the viewpoint of adjustment in molecular weight and improvement in offset resistance.

The molar ratio of the carboxylic acid component to the alcohol component, i.e. the carboxylic acid component/the alcohol component, is preferably from 0.5 to 1.3, more preferably from 0.6 to 1.3, and more preferably from 0.7 to 1.1.

In the production of the amorphous polyester of the present invention, the polycondensation of the alcohol component and the carboxylic acid component is preferably carried out at a temperature of from 160° to 250° C. in an inert gas atmosphere. The reaction temperature is preferably from 160° to 230° C., and more preferably from 180° to 220° C., from the viewpoint of reactivity and pyrolysis of the compound having a furan ring.

The amorphous polyester of the present invention can be synthesized with or without a catalyst depending on the combinations or the kinds of the raw material monomers used. For example, in a case without a catalyst, a resin having excellent hue of the toner can be obtained.

The catalyst includes, for example, esterification catalysts such as tin compounds and titanium compounds.

As the tin compound, for example, dibutyltin oxide is known; however, in the present invention, tin(II) compounds without containing a Sn—C bond are preferred from the viewpoint of excellent dispersibility in the polyester.

As the tin(II) compound without containing a Sn—C bond, a tin(II) compound having a Sn—O bond, a tin(II) compound having a Sn—X bond, wherein X is a halogen atom, or the like is preferable, and the tin(II) compound having a Sn—O bond is more preferable.

The tin(II) compound having a Sn—O bond includes tin(II) carboxylates having a carboxylate group having 2 to 28 carbon atoms, such as tin(II) oxalate, tin(II) acetate, tin(II) octanoate, tin(II) 2-ethylhexanoate, tin(II) laurate, tin(II) stearate, and tin(II) oleate; alkoxy tin(II) having an alkoxy group having 2 to 28 carbon atoms, such as octyloxy tin(II), lauroxy tin(II), stearoxy tin(II), and oleyloxy tin(II); tin(II) oxide; tin(II) sulfate; and the like. The tin(II) compound having a Sn—X bond, wherein X is a halogen atom, includes tin(II) halides, such as tin(II) chloride and tin(II) bromide, and the like. Among them, a fatty acid tin(II) represented by $(R^2COO)_2Sn$, wherein $R^2$ is an alkyl group or an alkenyl group having 5 to 19 carbon atoms, an alkoxy tin(II) represented by $(R^{3O})_2Sn$, wherein $R^3$ is an alkyl group or alkenyl group having 6 to 20 carbon atoms, and tin(II) oxide represented by SnO are preferable; the fatty acid tin(II) represented by $(R^2COO)_2Sn$ and tin(II) oxide are more preferable; tin(II) octanoate, tin(II) 2-ethylhexanoate, tin(II) stearate, and tin (II) oxide are even more preferable, from the viewpoint of an effect of initial rise in triboelectric charging and catalytic ability.

The esterification catalyst is present in an amount of preferably from 0.01 to 2.0 parts by weight, more preferably from 0.1 to 1.5 parts by weight, and even more preferably from 0.2 to 1.0 part by weight, based on 100 parts by weight of a total amount of the alcohol component and the carboxylic acid component. Here, the amount of the esterification catalyst present means an entire formulation amount of the catalysts used in the polycondensation reaction.

In the present invention, it is preferable that a pyrogallol compound having a benzene ring of which three hydrogen atoms bound to carbon atoms adjacent to each other are substituted by hydroxyl groups is used together with an esterification catalyst, from the viewpoint of improving storage property of the toner.

The pyrogallol compound includes pyrogallol, gallic acid, gallic acid esters, benzophenone derivatives such as 2,3,4-trihydroxybenzophenone and 2,2',3,4-tetrahydroxybenzophenone, catechin derivatives such as epigallocatechin and epigallocatechin gallate, and the like. Among them, a compound represented by the formula (III):

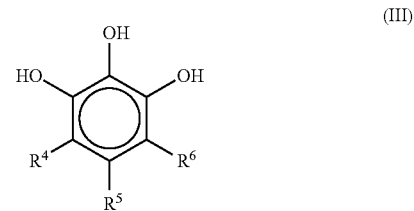

(III)

wherein each of $R^4$ to $R^6$ is independently a hydrogen atom or —$COOR^7$, wherein $R^7$ is a hydrogen atom or a hydrocarbon group having 1 to 12 carbon atoms, preferably an alkyl group having 1 to 12 carbon atoms or an alkenyl group having 2 to 12 carbon atoms, is preferable, from the viewpoint of storage property of the toner obtained. In the formula, the hydrocarbon group of $R^7$ has preferably 1 to 8 carbon atoms, and more preferably 1 to 4 carbon atoms, from the viewpoint of reaction activity. Among the compounds represented by the formula (III), a compound where each of $R^4$ and $R^6$ is a hydrogen atom, and $R^5$ is a hydrogen atom or —$COOR^7$ is more preferable. Specific examples include pyrogallol ($R^4$ to $R^6$: hydrogen atoms), gallic acid ($R^4$ and $R^6$: hydrogen atoms, $R^5$: —COOH), gallic acid esters, such as ethyl gallate ($R^4$ and $R^6$: hydrogen atoms, $R^5$: —$COOC_2H_5$), propyl gallate ($R^4$ and $R^6$: hydrogen atoms, $R^5$: —$COOC_3H_7$), butyl gallate ($R^4$ and R$^6$: hydrogen atoms, R$^5$: —COOC$_4$H$_9$), octyl gallate (R$^4$ and R$^6$: hydrogen atoms, R$^5$: —COOC$_8$H$_{17}$), and lauryl gallate (R$^4$ and R$^6$: hydrogen atoms, R$^5$: —COOC$_{12}$H$_{25}$), and the like. Gallic acid and the gallic acid esters are preferred from the viewpoint of storage property of the toner.

The pyrogallol compound is present in the polycondensation reaction in an amount of preferably from 0.001 to 1.0 part by weight, more preferably from 0.005 to 0.4 parts by weight, and even more preferably from 0.01 to 0.2 parts by weight, based on 100 parts by weight of the raw material monomers subjected to the polycondensation reaction, from the viewpoint of storage property of the toner. The amount of pyrogallol compound present as referred to herein means an entire formulation amount of pyrogallol compounds subjected to in the polycondensation reaction.

It is considered that the pyrogallol compound acts as a promoter for the esterification catalyst. The esterification catalyst used together with the pyrogallol compound is preferably at least one metal catalyst selected from the group consisting of tin compounds, titanium compounds, antimony trioxide, zinc acetate, and germanium dioxide.

The weight ratio of the pyrogallol compound to the esterification catalyst, i.e. the pyrogallol compound/the esterification catalyst, is preferably from 0.01 to 0.5, more preferably from 0.03 to 0.3, and even more preferably from 0.05 to 0.2, from the viewpoint of storage property of the toner.

The amorphous polyester of the present invention refers to a resin containing a polyester unit formed by polycondensation of an alcohol component and a carboxylic acid component, which includes not only polyesters but also polyester-polyamides and the like. Among them, the polyesters are preferred from the viewpoint of storage property and triboelectric stability of the toner.

Here, the polyester may be a polyester modified to an extent that the properties are not substantially impaired.

The modified resins of polyesters include, for instance, urethane-modified polyesters in which a polyester is modified with an urethane bond, epoxy-modified polyesters in which a polyester is modified with an epoxy bond, composite resins having two or more resin components including a polyester component and a vinyl resin component, and the like.

The composite resin containing a polyester component and a vinyl resin component may be produced by any of the methods, including a method including melt-kneading each of the resins in the presence of an initiator or the like as necessary, a method including dissolving each of the resins in a solvent, and mixing the solutions, and a method including polymerizing a mixture of raw material monomers for each of the resins. The composite resin is preferably a resin obtained by a polycondensation reaction and an addition polymerization reaction using the raw material monomers of the polyester component and the raw material monomers for the vinyl resin component mentioned above (Japanese Patent Laid-Open No. Hei-7-98518). Specifically, it is preferable that the composite resin is a hybrid resin obtained by further using, in addition to the raw materials monomers for a polycondensation resin and the raw material monomers for an addition polymerization resin, a compound capable of reacting with both of the raw material monomers for a polycondensation resin and the raw material monomers for an addition polymerization resin (dually reactive monomer), i.e. a resin in which a polycondensation resin and an addition polymerization resin are partially bonded via a dually reactive monomer. It is preferable that the dually reactive monomer is a compound having in its molecule an ethylenically unsaturated bond and at least one functional group selected from the group consisting of a hydroxyl group, a carboxyl group, an epoxy group, a primary amino group and a secondary amino group, preferably a hydroxyl group and/or a carboxyl group, and more preferably a carboxyl group. It is more preferable that the dually reactive monomer is acrylic acid, methacrylic acid, and fumaric acid.

The raw material monomers for a vinyl resin component includes styrenic compounds such as styrene and α-methylstyrene; ethylenically unsaturated monoolefins such as ethylene and propylene; diolefins such as butadiene; vinyl halides such as vinyl chloride; vinyl esters such as vinyl acetate and vinyl propionate; esters of ethylenic monocarboxylic acids such as alkyl(1 to 18 carbon atoms) esters of (meth)acrylic acid and dimethylaminoethyl(meth)acrylate; vinyl ethers such as vinyl methyl ether; vinylidene halides such as vinylidene chloride; N-vinyl compounds such as N-vinylpyrrolidone; and the like. Styrene, butyl acrylate, 2-ethylhexyl acrylate, and methyl methacrylate are preferable, from the viewpoint of reactivity, pulverizability and triboelectric stability. Styrene and/or an alkyl ester of (meth) acrylic acid is contained in an amount of preferably 50% by weight or more, and more preferably from 80 to 100% by weight of the vinyl resin component.

When the raw material monomers for a vinyl resin component are polymerized, a polymerization initiator, a crosslinking agent, or the like may be used, as necessary.

The weight ratio of the raw material monomers for a polyester component to the raw material monomers for a vinyl resin component, i.e. the raw material monomers for a polyester component/the raw material monomers for a vinyl resin component, is preferably from 55/45 to 95/5, more preferably from 60/40 to 95/5, and even more preferably from 70/30 to 90/10, from the viewpoint of forming the continuous matrix by the polyester component. Here, a dually reactive monomer is regarded as a raw material monomer for the polyester component.

The amorphous polyester of the present invention has a number-average molecular weight of preferably from 500 to 15,000, more preferably from 1,000 to 12,000, even more preferably from 1,000 to 10,000, and still even more preferably from 1,000 to 5,000, from the viewpoint of low-temperature fusing ability and storage property of the toner.

The amorphous polyester of the present invention is capable of adjusting the resin to a high glass transition temperature even when the amorphous polyester has a low molecular weight, and the amorphous polyester has a glass transition temperature of preferably from 45° to 100° C., more preferably from 50° to 85° C., and even more preferably from 50° to 80° C., from the viewpoint of low-temperature fusing ability and storage property of the toner. In addition, the amorphous polyester obtained using, as a raw material monomer, the aliphatic carboxylic acid compound having 6 to 40 carbon atoms and/or the aliphatic alcohol having 6 to 40 carbon atoms has a glass transition temperature of preferably from 40° to 100° C., more preferably from 45° to 85° C., and even more preferably from 45° to 80° C., from the viewpoint of low-temperature fusing ability and storage property of the toner.

The amorphous polyester of the present invention has a softening point of preferably from 80° to 180° C., more preferably from 90° to 160° C., even more preferably from 100° to 150° C., still even more preferably from 100° to 140° C., and still even more preferably from 100° to 130° C., from the viewpoint of low-temperature fusing ability and storage property of the toner. In addition, the amorphous polyester obtained using, as a raw material monomer, the aliphatic carboxylic acid compound having 6 to 40 carbon atoms and/ or the aliphatic alcohol having 6 to 40 carbon atoms has a softening point of preferably 180° C. or lower, from the viewpoint of low-temperature fusing ability of the toner, and the amorphous polyester has a softening point of preferably 80° C. or higher, from the viewpoint of storage property and durability of the toner, and the amorphous polyester has a softening point of preferably from 80° to 180° C., more preferably from 90° to 160° C., and even more preferably from 95° to 150° C., from the viewpoint of low-temperature fusing ability, storage property and durability of the toner.

Since the amorphous polyester of the present invention is capable of adjusting to a high glass transition temperature even when the softening point is low, when the amorphous polyester has a softening point of 80° C. or higher and lower than 115° C., the amorphous polyester has a glass transition temperature of preferably from 50° to 70° C., and more preferably from 55° to 65° C., from the viewpoint of low-temperature fusing ability and storage property of the toner. In addition, when the amorphous polyester has a softening point of from 115° to 180° C., the amorphous polyester has a glass transition temperature of preferably from 60° to 90° C., and more preferably from 65° to 85° C. In addition, when the amorphous polyester obtained using, as a raw material monomer, an aliphatic carboxylic acid compound having 6 to 40 carbon atoms and/or an aliphatic alcohol having 6 to 40 carbon atoms has a softening point of 80° C. or higher and lower than 115° C., the amorphous polyester has a glass transition temperature of preferably from 40° to 70° C., and more preferably from 50° to 65° C., from the viewpoint of low-temperature fusing ability, storage property and durability of the toner. In addition, when the amorphous polyester has a softening point of from 115° to 180° C., the amorphous polyester has a glass transition temperature of preferably from 55° to 90° C., and more preferably from 60° to 85° C.

Here, the softening point, the glass transition temperature and the number-average molecular weight of the amorphous polyester can be easily adjusted by adjusting components of the raw material monomers, a polymerization initiator, a molecular weight, an amount of a catalyst or the like, or selecting reaction conditions. For example, the polycondensation reaction can be progressed, and the softening point, the glass transition temperature, or the number-average molecular weight can be increased by increasing a temperature of the polycondensation reaction, extending a reaction time, increasing an amount of a catalyst, or using a promoter together. In addition, a glass transition temperature can also be increased by increasing a total amount of a carboxylic acid compound having a furan ring and an alcohol having a furan ring in a total amount of the carboxylic acid component and the alcohol component, used in the polycondensation reaction.

It is preferable that the amorphous polyester having a furan ring of the present invention comprises a resin having a higher softening point, i.e. a high-softening point resin, and a resin having a lower softening point, i.e. a low-softening point resin, from the viewpoint of low-temperature fusing ability, storage property and triboelectric stability of the toner.

The difference in softening points between the high-softening point resin and the low-softening point resin is preferably 10° C. or more, and more preferably from 20° to 60° C., from the viewpoint of low-temperature fusing ability and storage property of the toner.

The high-softening point resin has a softening point of preferably from 115° to 180° C., and more preferably from 120° to 160° C., and the low-softening point resin has a softening point of preferably 80° C. or higher and lower than 115° C., and more preferably from 90° to 110° C. The weight ratio of the high-softening point resin to the low-softening point resin, i.e. high-softening point resin/low-softening point resin, is preferably from 1/4 to 4/1, more preferably from 1/3 to 3/1, even more preferably from 1/2 to 2/1, even more preferably from 1/3 to 1/1, and even more preferably from 2/5 to 1/1.

The acid value is preferably from 1 to 90 mgKOH/g, more preferably from 1 to 80 mgKOH/g, even more preferably from 1 to 70 mgKOH/g, and even more preferably from 1 to 20 mgKOH/g, from the viewpoint of triboelectric stability of the toner. In addition, in a case where the amorphous polyester is combined with a crystalline polyester described later, the acid value is preferably from 0.1 to 70 mgKOH/g, more preferably from 1 to 50 mgKOH/g, and even more preferably from 5 to 25 mgKOH/g, from the viewpoint of triboelectric stability of the toner. The hydroxyl value is preferably from 1 to 100 mgKOH/g, more preferably from 1 to 80 mgKOH/g, even more preferably from 5 to 75 mgKOH/g, still even more preferably from 20 to 75 mgKOH/g, and still even more preferably from 25 to 70 mgKOH/g. In addition, the acid value of the amorphous polyester obtained using, as a raw material monomer, an aliphatic carboxylic acid compound having 6 to 40 carbon atoms and/or an aliphatic alcohol having 6 to 40 carbon atoms is preferably from 1 to 80 mgKOH/g, more preferably from 2 to 70 mgKOH/g, even more preferably from 3 to 60 mgKOH/g, and even more preferably from 3 to 20 mgKOH/g, from the viewpoint of triboelectric stability of the toner, and the hydroxyl value is preferably from 5 to 80 mgKOH/g, more preferably from 5 to 75 mgKOH/g, even more preferably from 10 to 70 mgKOH/g, and even more preferably from 40 to 70 mgKOH/g.

In the present invention, it is found that the storage property of the toner is further improved by using the above-mentioned amorphous polyester having a furan ring together with a crystalline polyester. Although the reasons therefor are not elucidated, it is deduced that the furan ring contained in the amorphous polyester is highly polar and has low compatibility with an α,ω-aliphatic diol used in an alcohol component of the crystalline polyester, so that crystallization of the crystalline polyester is more likely to be accelerated, thereby increasing the storage property of the toner.

The crystalline polyester in the present invention is obtained by polycondensing an alcohol component containing an α,ω-aliphatic diol and a carboxylic acid component.

The number of carbon atoms of the α,ω-aliphatic diol is preferably 10 or less, from the viewpoint of storage property of the toner, and more preferably from 2 to 10, even more preferably from 2 to 8, even more preferably from 4 to 6, and even more preferably 6, from the viewpoint of storage property and low-temperature fusing ability of the toner.

The α,ω-aliphatic diol includes ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, and the like.

The α,ω-aliphatic diol is preferably a linear α,ω-alkanediol, more preferably 1,4-butanediol and 1,6-hexanediol, and even more preferably 1,6-hexanediol, from the viewpoint of enhancement in crystallinity and low-temperature fusing ability and storage property of the toner.

The α,ω-aliphatic diol is contained in an amount of preferably from 50 to 100% by mol, more preferably from 70 to 100% by mol, even more preferably from 80 to 100% by mol, even more preferably from 90 to 100% by mol, and even more preferably substantially 100% by mol, of the alcohol component of the crystalline polyester, from the viewpoint of storage property and low-temperature fusing ability of the toner.

In addition, one kind of the α,ω-aliphatic diol (the identical number of carbon atoms and identical structure) is contained in an amount of preferably from 70 to 100% by mol, more preferably from 80 to 100% by mol, even more preferably from 90 to 100% by mol, and even more preferably substantially 100% by mol, of the alcohol component, from the viewpoint of storage property of the toner.

As a carboxylic acid component used in the crystalline polyester, the dicarboxylic acid compounds and the tricarboxylic or higher polycarboxylic acid compounds are used.

As the carboxylic acid component of the crystalline polyester, the aliphatic dicarboxylic acid compound is preferred, from the viewpoint of low-temperature fusing ability of the toner.

The aliphatic dicarboxylic acid compound includes aliphatic dicarboxylic acids such as oxalic acid, malonic acid, maleic acid, fumaric acid, citraconic acid, itaconic acid, glutaconic acid, succinic acid, adipic acid, sebacic acid, azelaic acid, n-dodecylsuccinic acid, and n-dodecenylsuccinic acid, acid anhydrides thereof, and alkyl(1 to 6 carbon atoms) esters thereof, and the like.

As the aliphatic dicarboxylic acid compound, an aliphatic dicarboxylic acid compound having preferably 2 to 12 carbon atoms, and more preferably 8 to 12 carbon atoms is preferred, and a sebacic acid compound is more preferred, from the viewpoint of low-temperature fusing ability of the toner. Here, as mentioned above, the aliphatic dicarboxylic acid compound refers to aliphatic dicarboxylic acids, esters formed between the aliphatic carboxylic acid and an alcohol having 1 to 6 carbon atoms, preferably 1 to 3 carbon atoms, and acid anhydrides thereof. Among them, the aliphatic dicarboxylic acid is preferred. The number of carbon atoms does not include the number of carbon atoms of the alkyl group in the alkyl ester.

The aliphatic dicarboxylic acid compound is contained in an amount of preferably from 70 to 100% by mol, more preferably from 80 to 100% by mol, 90 to 100% by mol, and even more preferably substantially 100% by mol, of the carboxylic acid component, from the viewpoint of storage property and low-temperature fusing ability of the toner.

Other dicarboxylic acid compounds include aromatic dicarboxylic acids such as phthalic acid, isophthalic acid, and terephthalic acid; alicyclic dicarboxylic acids such as cyclohexanedicarboxylic acid; and acid anhydrides thereof, alkyl(1 to 6 carbon atoms) esters thereof, and the like.

The aromatic dicarboxylic acid compound is contained in an amount of preferably from 70 to 100% by mol, more preferably from 80 to 100% by mol, even more preferably from 90 to 100% by mol, and even more preferably substantially 100% by mol, of the carboxylic acid component, from the viewpoint of triboelectric chargeability and storage property of the toner.

The tricarboxylic or higher polycarboxylic acid compound includes aromatic carboxylic acids, such as 1,2,4-benzenetricarboxylic acid (trimellitic acid), 2,5,7-naphthalenetricarboxylic acid, and pyromellitic acid; and derivatives such as acid anhydrides thereof and alkyl(1 to 3 carbon atoms) esters thereof.

The tricarboxylic or higher polycarboxylic acid compound is contained in an amount of preferably from 0 to 10% by mol, and more preferably from 0 to 5% by mol, of the carboxylic acid component, from the viewpoint of low-temperature fusing ability of the toner.

Other acids include rosins; rosins modified with fumaric acid, maleic acid, or acrylic acid; and the like.

Any one of the carboxylic acid component and the alcohol component, which are raw material monomers for a crystalline polyester may contain a carboxylic acid compound having a furan ring or an alcohol having a furan ring mentioned above as long as the effects of the present invention would not be impaired. The carboxylic acid compound having a furan ring and the alcohol having a furan ring are contained in a total amount of preferably from 0 to 40% by mol, more preferably from 0 to 20% by mol, even more preferably from 0 to 10% by mol, and even more preferably from 0 to 5% by mol, of a total amount of the carboxylic acid component and the alcohol component, from the viewpoint of low-temperature fusing ability of the toner.

Here, the alcohol component may properly contain a monohydric alcohol, and the carboxylic acid component may properly contain a monocarboxylic acid compound, from the viewpoint of adjustment in molecular weight and improvement in offset resistance.

The molar ratio of the carboxylic acid component to the alcohol component, i.e. the carboxylic acid component/the alcohol component, is preferably from 0.75 to 1.3, and more preferably from 0.8 to 1.3.

The crystalline polyester in the present invention has a melting point of preferably from 50° to 170° C., more preferably from 60° to 150° C., and even more preferably from 65° to 140° C., from the viewpoint of low-temperature fusing ability and storage property of the toner.

Here, the melting point of the crystalline polyester can be easily adjusted by adjusting components of the raw material monomers, a polymerization initiator, a molecular weight, an amount of a catalyst or the like, or selecting reaction conditions. For example, the polycondensation reaction can be progressed, and the melting point can be increased by increasing a temperature of the polycondensation reaction, extending a reaction time, increasing an amount of a catalyst, or using a promoter together.

The weight ratio of the crystalline polyester to the amorphous polyester, i.e. crystalline polyester/amorphous polyester, is preferably from 40/60 to 5/95, more preferably from 30/70 to 10/90, and even more preferably from 25/75 to 15/85, from the viewpoint of low-temperature fusing ability and storage property of the toner.

In the production of the crystalline polyester, the polycondensation of the alcohol component and the carboxylic acid component is preferably carried out at a temperature of from 160° to 250° C. in an inert gas atmosphere, and the reaction temperature is preferably from 160° to 240° C., and more preferably from 180° to 230° C., from the viewpoint of reactivity and pyrolysis of the compound having a furan ring.

The crystalline polyester can be synthesized with or without a catalyst depending on the combinations or the kinds of the raw material monomers used. For example, in a case without a catalyst, a resin having excellent hue can be obtained as a resin binder for use in a toner.

The kinds of the catalysts and the amount used may be the same as those in the case of the amorphous polyester.

Also in the production of the crystalline polyester, it is preferable that a pyrogallol compound having a benzene ring of which three hydrogen atoms bound to carbon atoms adjacent to each other are substituted by hydroxyl groups is used together with an esterification catalyst, from the viewpoint of improving storage property of the toner. The kinds of the pyrogallol compounds and the amount used may also be the same as those in the case of the amorphous polyester.

By using a resin binder containing the amorphous polyester of the present invention, a toner for electrophotography having excellent low-temperature fusing ability and storage property of the toner is obtained.

In the toner of the present invention, a known resin binder other than the above-mentioned amorphous polyester, for example, other resins including a vinyl resin such as styrene-acrylic resin, an epoxy resin, a polycarbonate, or a polyurethane may be used together within the range that would not impair the effects of the present invention. The resin binder of the present invention is contained in an amount of preferably 70% by weight or more, more preferably 80% by weight or more, even more preferably 90% by weight or more, and still even more preferably essentially 100% by weight, of the resin binder.

The toner of the present invention may further properly contain an additive such as a colorant, a releasing agent, a charge control agent, a charge control resin, a magnetic powder, a fluidity improver, an electric conductivity modifier, an extender pigment, a reinforcing filler such as a fibrous material, an antioxidant, an anti-aging agent, or a cleanability improver.

As the colorant, all of the dyes, pigments and the like which are used as colorants for toners can be used, and carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like can be used. The toner of the present invention may be any of black toner and color toner. The colorant is contained in an amount of preferably from 1 to 40 parts by weight, and more preferably from 2 to 10 parts by weight, based on 100 parts by weight of the resin binder.

The releasing agent includes waxes including polyolefin waxes, paraffin waxes, and silicones; fatty acid amides, such as oleic acid amide, erucic acid amide, ricinoleic acid amide, and stearic acid amide; vegetable waxes, such as carnauba wax, rice wax, candelilla wax, wood wax, and jojoba oil; animal waxes, such as beeswax; and mineral and petroleum waxes, such as montan wax, ozokerite, ceresin, microcrystalline wax, and Fischer-Tropsch wax. These releasing agents can be used alone, or in a mixture of two or more kinds.

The releasing agent has a melting point of preferably from 60° to 160° C., and more preferably from 60° to 150° C., from the viewpoint of low-temperature fusing ability and offset resistance of the toner.

The releasing agent is contained in an amount of preferably from 0.5 to 10 parts by weight, more preferably from 1 to 8 parts by weight, and even more preferably from 1.5 to 7 parts by weight, based on 100 parts by weight of the resin binder, from the viewpoint of dispersibility of the releasing agent in the resin binder.

The charge control agent is not particularly limited, and the charge control agent may contain any one of positively chargeable charge control agents and negatively chargeable charge control agents.

The positively chargeable charge control agent includes Nigrosine dyes, for example, "Nigrosine Base EX," "Oil Black BS," "Oil Black SO," "BONTRON N-01," "BONTRON N-04," "BONTRON N-07," "BONTRON N-09," "BONTRON N-11" (hereinabove manufactured by Orient Chemical Co., Ltd.), and the like; triphenylmethane-based dyes containing a tertiary amine as a side chain; quaternary ammonium salt compounds, for example, "BONTRON P-51" (manufactured by Orient Chemical Co., Ltd.), cetyltrimethylammonium bromide, "COPY CHARGE PX VP435" (manufactured by Clariant), and the like; polyamine resins, for example, "AFP-B" (manufactured by Orient Chemical Co., Ltd.), and the like; imidazole derivatives, for example, "PLZ-2001," "PLZ-8001" (hereinabove manufactured by SHIKOKU CHEMICAL CORPORATION), and the like; styrene-acrylic resins, for example, "FCA-701PT" (manufactured by FUJIKURA KASEI CO., LTD.), and the like.

In addition, the negatively chargeable charge control agent includes metal-containing azo dyes, for example, "VARIFAST BLACK 3804," "BONTRON S-31" (hereinabove manufactured by Orient Chemical Co., Ltd.), "T-77" (manufactured by Hodogaya Chemical Co., Ltd.), "BONTRON S-32," "BONTRON S-34," "BONTRON S-36," (hereinabove manufactured by Orient Chemical Co., Ltd.), "AIZEN SPILON BLACK TRH" (manufactured by Hodogaya Chemical Co., Ltd.), and the like, metal compounds of benzilic acid compounds, for example, "LR-147," "LR-297" (hereinabove manufactured by Japan Carlit, Ltd.), metal compounds of salicylic acid compounds, for example, "BONTRON E-81," "BONTRON E-84," "BONTRON E-88," "E-304" (hereinabove manufactured by Orient Chemical Co., Ltd.), "TN-105" (manufactured by Hodogaya Chemical Co., Ltd.), copper phthalocyanine dyes; quaternary ammonium salts, for example, "COPY CHARGE NX VP434" (manufactured by Clariant), nitroimidazole derivatives; organometallic compounds, for example, "TN105" (manufactured by Hodogaya Chemical Co., Ltd.), and the like.

The charge control agent is contained in an amount of preferably from 0.01 to 10 parts by weight, more preferably from 0.01 to 5 parts by weight, even more preferably from 0.3 to 3 parts by weight, still even more preferably from 0.5 to 3 parts by weight, and still even more preferably from 1 to 2 parts by weight, based on 100 parts by weight of the resin binder, from the viewpoint of triboelectric stability of the toner.

However, in a case where a styrene-acrylic resin is used as a charge control agent, the styrene-acrylic resin is contained in an amount of preferably from 3 to 40 parts by weight, more preferably from 4 to 30 parts by weight, and even more preferably from 5 to 20 parts by weight, based on 100 parts by weight of the resin binder, from the viewpoint of improving triboelectric chargeability of the toner.

The toner of the present invention may be a toner obtained by any of conventionally known methods such as a melt-kneading method, an emulsion phase-inversion method, and a polymerization method, and a pulverized toner produced by the melt-kneading method is preferable, from the viewpoint of productivity and colorant dispersibility. In the case of a pulverized toner produced by a melt-kneading method, for example, a toner can be produced by homogeneously mixing raw materials such as a resin binder, a colorant, and a charge control agent, with a mixer such as a Henschel mixer, thereafter melt-kneading the mixture with a closed kneader, a single-screw or twin-screw extruder, an open roller-type kneader, or the like, cooling, pulverizing, and classifying the product. On the other hand, a toner produced by the polymerization method is preferable, from the viewpoint of forming a toner having a small particle size.

The toner for electrophotography of the present invention may be a toner obtained by a method including the step of forming raw materials containing a resin binder of the present invention into fine particles in an aqueous medium. A production method thereof is not particularly limited, and the method includes, for example, (A) a method including previously forming primary particles containing a resin binder in an aqueous medium, and aggregating/coalescing the primary particles;

(B) a method including previously forming primary particles containing a resin binder in an aqueous medium, and fusing the primary particles;

(C) a method including dispersing raw materials containing a resin bind er in an aqueous medium, and forming the dispersion into fine particles, and the like.

In the present invention, the method (A) is preferred, and a method including:

(1) introducing an aqueous medium to a mixed solution prepared by dissolving or dispersing raw materials containing a resin binder in an organic solvent, and thereafter removing the organic solvent from the mixture, to provide an aqueous dispersion of primary particles containing a resin binder; and (2) aggregating or coalescing the primary particles is preferred.

A specific example of the method (B) includes a method including subjecting a radical-polymerizable monomer solution in which a resin binder is dissolved to an emulsion polymerization to give fine resin particles, and fusing the resulting fine resin particles in an aqueous medium (see Japanese Patent Laid-Open No. 2001-42568). A specific example of the method (C) includes a method including thermally fusing raw materials containing a resin binder, dispersing the raw materials in an aqueous medium without containing an organic solvent, while maintaining a molten state of the resin binder, and thereafter drying the dispersion (see Japanese Patent Laid-Open No. 2001-235904), and the like.

The step (1) is a step of introducing an aqueous medium to a mixed solution prepared by dissolving or dispersing raw materials containing a resin binder in an organic solvent, and thereafter removing the organic solvent from the mixture, to provide an aqueous dispersion of primary particles containing a resin binder.

It is preferable that the organic solvent is used in an amount of from 100 to 1,000 parts by weight, based on 100 parts by weight of the resin binder. Water and further a neutralizing agent, as occasion demands, are mixed with the mixed solution while stirring, and thereafter the organic solvent is removed from the resulting dispersion, whereby an aqueous dispersion of primary particles of a self-dispersible resin can be obtained.

The aqueous medium is used in an amount of preferably from 100 to 1,000 parts by weight, based on 100 parts by weight of the organic solvent. Here, the aqueous medium usable in the process (1) may contain a solvent such as an organic solvent, and contains water in an amount of preferably 50% by weight or more, preferably 70% by weight or more, more preferably from 90% by weight or more, and even more preferably 99% by weight or more.

Upon stirring the mixture, a generally employed mixing agitator such as an anchor blade can be used. The neutralizing agent includes an alkali metal of lithium hydroxide, sodium hydroxide, potassium hydroxide, or the like; and organic bases such as ammonia, trimethylamine, ethylamine, diethylamine, triethylamine, triethanolamine, and tributylamine. The neutralizing agent is added in an amount of preferably from 0.5 to 1.5 equivalents, more preferably from 0.7 to 1.3 equivalents, and even more preferably from 0.8 to 1.2 equivalents, based on the acid value of the polyester after the reaction to be subjected to neutralization.

A dispersant can be used for the purposes of lowering a melt viscosity and a melting point of the resin binder, and improving dispersibility of the formed primary particles. The dispersant includes, for example, water-soluble polymers such as polyvinyl alcohol, methyl cellulose, ethyl cellulose, hydroxyethyl cellulose, carboxymethyl cellulose, sodium polyacrylate, and sodium polymethacrylate; anionic surfactants such as sodium dodecylbenzenesulfonate, sodium octadecyl sulfate, sodium oleate, sodium laurate, and potassium stearate; cationic surfactants such as laurylamine acetate, stearylamine acetate, and lauryl trimethylammonium chloride; amphoteric surfactants such as lauryl dimethylamine oxide; and inorganic salts such as tricalcium phosphate, aluminum hydroxide, calcium sulfate, calcium carbonate, and barium carbonate. The dispersant is used in an amount of preferably 20 parts by weight or less, more preferably 15 parts by weight or less, and even more preferably 10 parts by weight or less, based on 100 parts by weight of the resin binder, from the viewpoint of emulsion stability and detergency.

The solid content of the dispersion of the primary particles containing a resin binder obtained in the step (1) (hereinafter also simply referred to as primary particles) is preferably from 7 to 50% by weight, and more preferably from 7 to 40% by weight, from the viewpoint of stability of the dispersion and handling property of the dispersion in the aggregating step. The solid content includes non-volatile components such as a resin.

The primary particles have an average particle size of preferably from 0.05 to 3 μm, more preferably from 0.05 to 1 μm, and even more preferably from 0.05 to 0.8 from the viewpoint of homogeneously aggregating the primary particles in the subsequent steps. In the present invention, the average particle size of the primary particles refers to a volume-median particle size (D50), which can be measured with a laser diffraction particle size analyzer or the like.

Subsequently, the step (step (2)) of aggregating and coalescing the primary particles obtained in the step (1) will be explained.

In the step (2), the solid content of the system in the aggregating step of aggregating the primary particles obtained in the step (1) can be adjusted by adding water to a dispersion of a resin binder, and the solid content is preferably from 5 to 50% by weight, more preferably from 5 to 30% by weight, and even more preferably from 5 to 20% by weight, in order to cause homogeneous aggregation.

The pH inside the system in the aggregating step is preferably from 2 to 10, more preferably from 2 to 9, and even more preferably from 3 to 8, from the viewpoint of satisfying both dispersion stability of a mixed solution and aggregating property of the fine particles made of a resin binder or the like.

It is preferable that the temperature inside the system in the aggregating step is a temperature equal to or higher than a temperature calculated from a softening point of a resin binder minus 70° C. or more and equal to or lower than a softening point, from the same viewpoint.

In addition, an additive such as a colorant or a charge control agent may be previously mixed with a resin binder upon the preparation of primary particles, or each additive may be separately dispersed in a dispersion medium such as water to prepare a dispersion, and the dispersion is mixed with primary particles, and subjected to the aggregating step. In a case where an additive is previously mixed with a resin binder upon the preparation of primary particles, it is preferable that the resin binder and the additive are previously melt-kneaded. In the melt-kneading, it is preferable to use an open roller-type twin-screw kneader. The open-roller twin-screw kneader is a kneader provided with two rollers arranged in parallel closely to each other, wherein a heating function or a cooling function can be provided by passing a heating medium through each roller. Therefore, the open-roller type twin-screw kneader contains a melt-kneading part that is open, and also is equipped with a heat roller and a cooling roller, so that the open-roller type twin-screw kneader can easily dissipate the kneading heat generated during the melt-kneading, which is different from twin-screw extruders conventionally used.

In the aggregating step, in order to effectively carry out the aggregation, an aggregating agent can be added. As the aggregating agent, a cationic surfactant in the form of a quaternary salt, polyethyleneimine, or the like may be used as an organic aggregating agent, and an inorganic metal salt, a divalent or higher polyvalent metal complex or the like may be used as an inorganic aggregating agent. The inorganic metal salt includes, for example, metal salts such as sodium sulfate, sodium chloride, calcium chloride, calcium nitrate, barium chloride, magnesium chloride, zinc chloride, aluminum chloride, and aluminum sulfate; and inorganic metal salt polymers such as poly(aluminum chloride), poly(aluminum hydroxide), and poly(calcium sulfide).

The aggregating agent is used in an amount of preferably 30 parts by weight or less, more preferably 20 parts by weight or less, and even more preferably 10 parts by weight or less, based on 100 parts by weight of the resin binder, from the viewpoint of the environmental resistance of the toner.

Subsequently, the aggregated particles containing at least a resin binder obtained in the above-mentioned aggregating step are heated to coalesce (coalescing step).

The temperature inside the system in the coalescing step is preferably equal to or higher than a temperature calculated from the softening point of the resin binder –(minus) 50° C. and equal to or lower than a temperature calculated from the softening point of the resin binder +(plus) 10° C., more preferably equal to or higher than the softening point of the resin binder minus 45° C. and equal to or lower than a temperature calculated from the softening point plus 10° C., and even more preferably equal to or higher than the softening point of the resin binder minus 40° C. and equal to or lower than a temperature calculated from the softening point of the resin binder plus 10° C., from the viewpoint of controlling particle sizes, particle size distribution, and shapes of the intended toner, and fusibility of the particles. In addition, it is preferable that the stirring rate is a rate at which the aggregate particles are not precipitated. In the present invention, in a case where two or more kinds of resins are used as a resin binder, a softening point of mixed resins is regarded as a softening point of the resin binder.

The coalesced particles obtained in the step (2) are properly subjected to liquid-solid separation step such as filtration, washing step, and drying step, whereby a toner can be obtained.

In the washing step, it is preferable that an acid is used for removing metal ions on the toner surface, from the viewpoint of ensuring satisfactory triboelectric charging properties and reliability as a toner. Also, in a case where a nonionic surfactant is used in a dispersion of a colorant or the like, it is preferable that the nonionic surfactant is completely removed by washing, and it is preferable that the washing is carried out with an aqueous solution at a temperature equal to or lower than the cloud point of the nonionic surfactant. The washing is carried out preferably plural times.

In addition, in the drying step, any methods such as vibration-type fluidizing drying method, spray-drying method, freeze-drying method, or flash jet method can be employed.

The toner of the present invention has a volume-median particle size ($D_{50}$) of preferably from 3 to 15 and more preferably from 3 to 10 Here, the volume-median particle size ($D_{50}$) as used herein means a particle size at 50% counting from smaller particle sizes in a cumulative volume frequency calculated in volume percentage.

In the toner of the present invention, it is preferable that fine inorganic particles are used as an external additive for improving transferablility. Specific examples preferably include one or more members selected from the group consisting of silica, alumina, titania, zirconia, tin oxide, and zinc oxide. Among them, silica is preferred, and it is more preferable to contain a silica having a small specific gravity, from the viewpoint of preventing embedment.

It is preferable that the silica is a hydrophobic silica that is hydrophobically treated, from the viewpoint of transferability of the toner.

The hydrophobic treatment agent for hydrophobically treating the surface of silica particles is exemplified by organochlorosilane, organoalkoxysilane, organodisilazane, cyclic organopolysilazane, linear organopolysiloxane and the like, and specifically include hexamethyldisilazane (HMDS), dimethyldichlorosilane (DMDS), a silicone oil, octyltriethoxysilane (OTES), methyltriethoxysilane, and the like. Among them, hexamethyldisilazane is preferred.

The external additive has an average particle size of preferably from 10 to 250 nm, more preferably from 10 to 200 nm, even more preferably from 15 to 150 nm, and even more preferably from 15 to 90 nm, from the viewpoint of triboelectric chargeability, fluidity, and transferability of the toner.

The external additive is contained in an amount of preferably from 0.05 to 5 parts by weight, more preferably from 0.1 to 3 parts by weight, and even more preferably from 0.3 to 3 parts by weight, based on 100 parts by weight of the toner before the treatment with the external additive.

The toner of the present invention can be used as a toner for monocomponent development, or a two-component developer prepared by mixing the toner with a carrier.

EXAMPLES

The following examples further describe and demonstrate embodiments of the present invention. The examples are given solely for the purposes of illustration and are not to be construed as limitations of the present invention.

[Softening Point of Resin]

The softening point refers to a temperature at which a half of the sample flows out, when plotting a downward movement of a plunger of a flow tester (Shimadzu Corporation, CFT-500D), against temperature, in which a sample is prepared by applying a load of 1.96 MPa thereto with the plunger using the flow tester and extruding a 1 g sample through a nozzle having a die pore size of 1 mm and a length of 1 mm, while heating the sample so as to raise the temperature at a rate of 6° C./min.

[Highest Temperature of Endothermic Peak of Resin]

Measurements were taken using a differential scanning calorimeter (Q-100, manufactured by TA Instruments, Japan), by cooling a 0.01 to 0.02 g sample weighed out in an aluminum pan from room temperature to 0° C. at a cooling rate of 10° C./min, allowing the cooled sample to stand for 1 minute, and thereafter heating the sample at a rate of 50° C./min. Among the endothermic peaks observed, the temperature of an endothermic peak on the highest temperature side is defined as a highest temperature of endothermic peak.

[Glass Transition Temperature of Resin]

The glass transition temperature refers to a temperature of an intersection of the extension of the baseline of equal to or lower than the highest temperature of the endothermic peak and the tangential line showing the maximum inclination between the kick-off of the peak and the top of the peak, which is determined using a differential scanning calorimeter (manufactured by Seiko Instruments, Inc., DSC 210) of a sample of which temperature is heated at a rate of 10° C./min., the sample prepared by measuring out a sample in an amount of from 0.01 to 0.02 g on an aluminum pan, raising its temperature to 200° C., and cooling the sample from that temperature to 0° C. at a cooling rate of 10° C./min.

[Acid Value of Resin]

The acid value is measured based on a method of JIS K0070, provided that only a measurement solvent is changed from a mixed solvent of ethanol and ether as prescribed in JIS K0070 to a mixed solvent of acetone and toluene (acetone:toluene=1:1 (volume ratio)).

[Hydroxyl Value of Resin]

The hydroxyl value is measured as prescribed by a method of JIS K0070.

[Number-Average Molecular Weight (Mn) of Resin]

The number-average molecular weight is obtained by measuring a molecular weight distribution in accordance with a gel permeation chromatography (GPC) method in the following manner.

(1) Preparation of Sample Solution

A sample is dissolved in tetrahydrofuran at 25° C. so as to have a concentration of 0.5 g/100 ml. Next, this solution is filtered with a fluororesin filter (manufactured by ADVANTEC, DISMIC-25JP) having a pore size of 0.2 µm, to remove an insoluble component, to provide a sample solution.

(2) Measurement of Molecular Weight

The measurement is taken by allowing tetrahydrofuran to flow through a column as an eluent at a flow rate of 1 ml per minute, and stabilizing the column in a thermostat at 40° C., and injecting 100 µl of a sample solution into the column. The molecular weight of the sample is calculated based on the previously drawn calibration curve. At this time, a calibration curve is drawn from several kinds of monodisperse polystyrenes (manufactured by Tosoh Corporation, A-500 ($5.0 \times 10^2$), A-1000 ($1.01 \times 10^3$), A-2500 ($2.63 \times 10^3$), A-5000 ($5.97 \times 10^3$), F-1 ($1.02 \times 10^4$), F-2 ($1.81 \times 10^4$), F-4 ($3.97 \times 10^4$), F-10 ($9.64 \times 10^4$), F-20 ($1.90 \times 10^5$), F-40 ($4.27 \times 10^5$), F-80 ($7.06 \times 10^5$), and F-128 ($1.09 \times 10^6$)) as standard samples.

Measurement Apparatus: HLC-8220GPC (manufactured by Tosoh Corporation)

Analyzing Column: GMHLX+G3000HXL (manufactured by Tosoh Corporation)

[Melting Point of Releasing Agent]

A highest temperature of endothermic peak obtained by raising the temperature of a sample at a rate of 10° C./min., the sample prepared by raising the temperature of a sample to 200° C. using a differential scanning calorimeter (manufactured by Seiko Instruments, Inc., DSC 210), and cooling the heated sample from that temperature to 0° C. at a cooling rate of 10° C./min., is referred to as a melting point.

[Volume-Median Particle Size ($D_{50}$) of Toner]

Measuring Apparatus: Coulter Multisizer II (manufactured by Beckman Coulter)

Aperture Diameter: 50 µm

Analyzing Software: Coulter Multisizer AccuComp Ver. 1.19 (manufactured by Beckman Coulter)

Electrolytic Solution: Isotone II (manufactured by Beckman Coulter)

Dispersion: A 5% electrolytic solution of EMULGEN 109P (manufactured by Kao Corporation, polyoxyethylene lauryl ether, HLB: 13.6).

Dispersion Conditions Ten milligrams of a measurement sample is added to 5 ml of the above-mentioned dispersion, the mixture is dispersed for 1 minute with an ultrasonic disperser, and 25 ml of an electrolytic solution is added to the dispersion, and further dispersed with an ultrasonic disperser for 1 minute.

Measurement Conditions: The above-mentioned sample dispersion is added to 100 ml of the above-mentioned electrolytic solution in a beaker to adjust to a concentration at which particle sizes of 30,000 particles can be measured in 20 seconds, and thereafter the 30,000 particles are measured, and a volume-median particle size ($D_{50}$) is obtained from the particle size distribution.

[Average Particle Size of External Additive]

The average particle size refers to a number-average particle size, which is an average of particle sizes of 500 particles of the external additive, measured from a photograph taken with a scanning electron microscope (SEM). In a case where the particles have length and breath, it refers to the length.

Example A

A.1 Production Example 1 of Resins

Resins 1, 2, 4 to 7, 9, 10, and 12 to 15

A 5-liter four-neck flask equipped with a thermometer, a stainless steel stirring rod, a reflux condenser, and a nitrogen inlet tube was charged with raw material monomers and esterification catalyst and promoter, as listed in Tables A1 to A3, and the contents were heated in a mantle heater to 180° C. in a nitrogen atmosphere, and thereafter heated to 210° C. over 5 hours. Thereafter, having confirmed that a reaction percentage at 210° C. reached 95% or higher, the reaction mixture was subjected to a reaction at 40 kPa until a softening point as listed in Tables A1 to A3 was reached, to provide each of polyesters (Resins 1, 2, 4 to 7, 9, 10, and 12). Here, the reaction percentage as used herein means a value defined by a value calculated by: [amount of generated water in reaction/theoretical amount of generated water]×100.

A.2 Production Example 2 of Resins

Resins 3 and 11

A 5-liter four-neck flask equipped with a thermometer, a stainless steel stirring rod, a reflux condenser, and a nitrogen inlet tube was charged with raw material monomers and esterification catalyst and promoter, as listed in Table A1 or A2, and the contents were heated in a mantle heater to 235° C. in a nitrogen atmosphere, and the heated mixture was reacted at 235° C. for 10 hours. Thereafter, the reaction mixture was subjected to a reaction at 235° C. and 8 kPa for 1 hour, and then cooled to 210° C., and the mixture was subjected to a reaction at 20 kPa until a softening point as listed in Table A1 or A2 was reached, to provide each of polyesters (Resins 3 and 11).

A.3 Production Example 3 of Resin

Resin 8

A 5-liter four-neck flask equipped with a thermometer, a stainless steel stirring rod, a reflux condenser, and a nitrogen inlet tube was charged with raw material monomers other than trimellitic anhydride and an esterification catalyst, as listed in Table A2, and the contents were heated in a mantle heater to 180° C. in a nitrogen atmosphere, and thereafter heated to 210° C. over 5 hours. Thereafter, having confirmed that a reaction percentage at 210° C. reached 95% or higher, trimellitic anhydride as listed in Table A2 was supplied thereto. The mixture was subjected to a reaction at a normal pressure for 1 hour, and thereafter subjected to a reaction at 40 kPa until a softening point as listed in Table A2 was reached, to provide a polyester (Resin 8).

A.4 Production Example 4 of Resins

Resins 16 to 18

A 5-liter four-neck flask equipped with a thermometer, a stainless steel stirring rod, a reflux condenser, and a nitrogen inlet tube was charged with raw material monomers other than the aliphatic hydroxycarboxylic acid and esterification catalyst and promoter, as listed in Table A4, and the contents were heated in a mantle heater to 180° C. in a nitrogen atmosphere, and thereafter heated to 210° C. over 5 hours. Thereafter, having confirmed that a reaction percentage at 210° C. reached 90% or higher, the aliphatic hydroxycarboxylic acid as listed in Table A4 was supplied thereto. The mixture was subjected to a reaction at 210° C. for 1 hour, and subjected to a reaction at 40 kPa until a softening point as listed in Table A4 was reached, to provide each of amorphous polyesters (Resins 16 to 18). Here, the reaction percentage as used herein means a value defined by a value calculated by: [amount of generated water in reaction/theoretical amount of generated water]×100.

A.5 Production Example 5 of Resin

Resin 19

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers for a polyester other than trimellitic anhydride and an esterification catalyst, as listed in Table A4. The mixture was kept at 180° C. for 1 hour in a nitrogen atmosphere, and thereafter heated from 180° to 210° C. at a rate of 10° C./hr, and the heated mixture was then subjected to a polycondensation reaction at 210° C. for 5 hours, and further subjected to a reaction at 210° C. and 8.0 kPa for 1 hour. After cooling the reaction mixture to 160° C., a mixture of a dually reactive monomer, raw material monomers for a styrenic resin and a polymerization initiator as listed in Table A4 was added dropwise thereto with a dropping funnel over 1 hour. After the dropwise addition, the addition polymerization reaction was matured for 1 hour, while keeping the mixture at 160° C. Thereafter, the mixture was heated to 210° C., trimellitic anhydride was then supplied thereto, and the mixture was subjected to a reaction at 210° C. for 2 hours, and subjected to a reaction at 210° C. and 10 kPa until a desired softening point was reached, to provide an amorphous polyester (Resin 19).

A.6 Production Example 6 of Resins

Resins 20 and 21

A 5-liter four-neck flask equipped with a thermometer, a stainless steel stirring rod, a reflux condenser, and a nitrogen inlet tube was charged with raw material monomers and an esterification catalyst, as listed in Table A4, and the contents were heated in a mantle heater to 180° C. in a nitrogen atmosphere, and thereafter heated to 210° C. over 5 hours. Thereafter, having confirmed that a reaction percentage at 210° C. reached 95% or higher, the reaction mixture was subjected to a reaction at 40 kPa until a desired softening point was reached, to provide each of amorphous polyesters (Resins 20 and 21). Here, the reaction percentage as used herein means a value defined by a value calculated by: [amount of generated water in reaction/theoretical amount of generated water]×100.

TABLE A1

| | Resin 1 Amount Used | | Resin 2 Amount Used | | Resin 3 Amount Used | | Resin 4 Amount Used | | Resin 5 Amount Used | | Resin 6 Amount Used | |
|---|---|---|---|---|---|---|---|---|---|---|---|---|
| | molar ratio | g | molar ratio | g | molar ratio | g | molar ratio | g | molar ratio | g | molar ratio | g |
| Raw Material Monomers Alcohol Component | | | | | | | | | | | | |
| 1,2-Propanediol | 100 | 1,520 | — | — | — | — | 100 | 1,520 | 100 | 1,520 | 100 | 1,520 |
| 2,3-Butanediol | — | — | 100 | 1,800 | — | — | — | — | — | — | — | — |
| BPA-PO[1] | — | — | — | — | 70 | 2,450 | — | — | — | — | — | — |
| BPA-EO[2] | — | — | — | — | 30 | 975 | — | — | — | — | — | — |
| Carboxylic Acid Component | | | | | | | | | | | | |
| Furan-2,5-Dicarboxylic Acid | 80 | 2,496 | 80 | 2,496 | 80 | 1,248 | — | — | — | — | 60 | 1,872 |
| Furan-2,4-Dicarboxylic Acid | — | — | — | — | — | — | 80 | 2,496 | — | — | — | — |
| Ethyl Furan-2,5-Dicarboxylate | — | — | — | — | — | — | — | — | 80 | 3,392 | — | — |
| Furan-2-Carboxylic Acid | — | — | — | — | — | — | — | — | — | — | 40 | 896 |
| Esterification Catalyst/Promoter | | | | | | | | | | | | |
| Tin(II) 2-Ethylhexanoate | — | 20.1 | — | 21.5 | — | 23.4 | — | — | — | 24.6 | — | 21.4 |
| Gallic Acid | — | 0.8 | — | 0.8 | — | — | — | — | — | 1.0 | — | — |
| Total Amount of Carboxylic Acid Compound Having Furan Ring and Alcohol Having Furan Ring[3] [X] (% by mol) | 44.4 | | 44.4 | | 44.4 | | 44.4 | | 44.4 | | 50.0 | |
| Softening Point (° C.) | 103.2 | | 102.6 | | 102.1 | | 104.2 | | 102.5 | | 101.8 | |
| Highest Temperature of Endothermic Peak (° C.) | 68.4 | | 70.1 | | 63.9 | | 63.7 | | 62.5 | | 60.6 | |
| Softening Point/Highest Temperature of Endothermic Peak | 1.51 | | 1.46 | | 1.59 | | 1.64 | | 1.64 | | 1.68 | |
| Glass Transition Temperature (° C.) | 62.9 | | 65.1 | | 59.4 | | 59.6 | | 58.6 | | 56.7 | |
| Acid Value (mgKOH/g) | 2.3 | | 10.5 | | 10.3 | | 3.1 | | 3.2 | | 4.5 | |
| Hydroxyl Value (mgKOH/g) | 71.2 | | 85.4 | | 40.6 | | 68.4 | | 67.1 | | 56.6 | |
| Number-Average Molecular Weight | 1,800 | | 1,400 | | 2,100 | | 1,900 | | 2,000 | | 2,000 | |

[1] Polyoxypropylene(2.2)-2,2-bis(4-hydroxyphenyl)propane
[2] Polyoxyethylene(2.2)-2,2-bis(4-hydroxyphenyl)propane
[3] A total amount of the carboxylic acid compound having a furan ring and the alcohol having a furan ring in a total amount of the carboxylic acid component and the alcohol component

TABLE A2

|  | Resin 7 Amount Used | | Resin 8 Amount Used | | Resin 9 Amount Used | | Resin 10 Amount Used | | Resin 11 Amount Used | | Resin 12 Amount Used | |
| --- | --- | --- | --- | --- | --- | --- | --- | --- | --- | --- | --- | --- |
|  | molar ratio | g | molar ratio | g | molar ratio | g | molar ratio | g | molar ratio | g | molar ratio | g |
| Raw Material Monomers | | | | | | | | | | | | |
| Alcohol Component | | | | | | | | | | | | |
| 1,2-Propanediol | 100 | 1,520 | 100 | 1,520 | 100 | 1,520 | 80 | 1,216 | — | — | 100 | 1,140 |
| BPA-PO[1)] | — | — | — | — | — | — | — | — | 70 | 2,450 | — | — |
| BPA-EO[2)] | — | — | — | — | — | — | — | — | 30 | 975 | — | — |
| 5-Hydroxymethylfurfuryl Alcohol | — | — | — | — | — | — | 20 | 512 | — | — | — | — |
| Carboxylic Acid Component | | | | | | | | | | | | |
| Furan-2,5-Dicarboxylic Acid | 40 | 1,248 | 60 | 1,872 | 30 | 936 | 80 | 2,496 | — | — | — | — |
| Furan-2,4-Dicarboxylic Acid | — | — | — | — | — | — | — | — | — | — | — | — |
| Ethyl Furan-2,5-Dicarboxylate | — | — | — | — | 50 | 2,120 | — | — | — | — | — | — |
| Terephthalic Acid | 40 | 1,328 | — | — | — | — | — | — | 80 | 1,328 | 80 | 1,328 |
| Trimellitic Anhydride | — | — | 20 | 768 | — | — | — | — | — | — | — | — |
| Esterification Catalyst/Promoter | | | | | | | | | | | | |
| Tin(II) 2-Ethylhexanoate | — | 20.5 | — | 20.8 | — | — | — | 21.1 | — | 17.7 | — | 12.3 |
| Gallic Acid | — | 1.0 | — | — | — | — | — | — | — | — | — | — |
| Total Amount of Carboxylic Acid Compound Having Furan Ring and Alcohol Having Furan Ring[3)] [X] (% by mol) | | 22.2 | | 33.3 | | 44.4 | | 55.6 | | 0.0 | | 0.0 |
| Softening Point (° C.) | | 100.4 | | 128.6 | | 104.5 | | 103.4 | | 113.5 | | 103.8 |
| Highest Temperature of Endothermic Peak (° C.) | | 61.2 | | 73.4 | | 64.7 | | 63.3 | | 58.6 | | 53.2 |
| Softening Point/Highest Temperature of Endothermic Peak | | 1.64 | | 1.75 | | 1.62 | | 1.63 | | 1.93 | | 1.95 |
| Glass Transition Temperature (° C.) | | 57.8 | | 70.4 | | 60.4 | | 59.1 | | 55.4 | | 56.0 |
| Acid Value (mgKOH/g) | | 10.4 | | 11.2 | | 18.5 | | 5.8 | | 8.6 | | 5.4 |
| Hydroxyl Value (mgKOH/g) | | 55.6 | | 68.4 | | 67.7 | | 64.7 | | 23.4 | | 42.5 |
| Number-Average Molecular Weight | | 2,200 | | 2,300 | | 2,000 | | 2,200 | | 2,800 | | 2,700 |

[1)]Polyoxypropylene(2.2)-2,2-bis(4-hydroxyphenyl)propane
[2)]Polyoxyethylene(2.2)-2,2-bis(4-hydroxyphenyl)propane
[3)]A total amount of the carboxylic acid compound having a furan ring and the alcohol having a furan ring in a total amount of the carboxylic acid component and the alcohol component

TABLE A3

|  | Resin 13 Amount Used | | Resin 14 Amount Used | | Resin 15 Amount Used | |
| --- | --- | --- | --- | --- | --- | --- |
|  | molar ratio | g | molar ratio | g | molar ratio | g |
| Raw Material Monomers Alcohol Component | | | | | | |
| 1,2-Propanediol | — | — | 50 | 760 | — | — |
| 2,3-Butanediol | 100 | 1,800 | — | — | — | — |
| 1,3-Propanediol | — | — | 50 | 760 | 100 | 1,520 |
| Carboxylic Acid Component | | | | | | |
| Furan-2,5-Dicarboxylic Acid | 40 | 1,248 | 80 | 2,496 | 80 | 2,496 |
| Esterification Catalyst/Promoter | | | | | | |
| Tin(II) 2-Ethylhexanoate | — | 15.2 | — | 20.1 | — | — |
| Gallic Acid | — | — | — | — | — | — |
| Total Amount of Carboxylic Acid Compound Having Furan Ring and Alcohol Having Furan Ring[3)] [X] (% by mol) | | 28.6 | | 44.4 | | 44.4 |
| Softening Point (° C.) | | 98.9 | | 110.2 | | 113.5 |
| Highest Temperature of Endothermic Peak (° C.) | | 56.3 | | 58.9 | | 53.2 |
| Softening Point/Highest Temperature of Endothermic Peak | | 1.76 | | 1.87 | | 2.13 |
| Glass Transition Temperature (° C.) | | 52.5 | | 55.4 | | 50.1 |
| Acid Value (mgKOH/g) | | 10.5 | | 6.5 | | 1.8 |
| Hydroxyl Value (mgKOH/g) | | 94.3 | | 46.8 | | 42.1 |
| Number-Average Molecular Weight | | 980 | | 3,200 | | 3,600 |

[1)]Polyoxypropylene(2.2)-2,2-bis(4-hydroxyphenyl)propane
[2)]Polyoxyethylene(2.2)-2,2-bis(4-hydroxyphenyl)propane
[3)]A total amount of the carboxylic acid compound having a furan ring and the alcohol having a furan ring in a total amount of the carboxylic acid component and the alcohol component

TABLE A4

|  | Resin 16 Amount Used | | Resin 17 Amount Used | | Resin 18 Amount Used | | Resin 19 Amount Used | | Resin 20 Amount Used | | Resin 21 Amount Used | |
| --- | --- | --- | --- | --- | --- | --- | --- | --- | --- | --- | --- | --- |
|  | molar ratio | g | molar ratio | g | molar ratio | g | molar ratio | g | molar ratio | g | molar ratio | g |
| Raw Material Monomers | | | | | | | | | | | | |
| Alcohol Component | | | | | | | | | | | | |
| 1,2-Propanediol | 100 | 1,520 | 100 | 1,520 | 100 | 1,520 | 50 | 608 | 40 | 486 | 50 | 608 |
| 2,3-Butanediol | — | — | — | — | — | — | 50 | 720 | 30 | 432 | 50 | 720 |
| Glycerol | — | — | — | — | — | — | — | — | 20 | 294 | — | — |
| Carboxylic Acid Component | | | | | | | | | | | | |
| Furan-2,5-Dicarboxylic Acid | 80 | 2,496 | 80 | 2,496 | 80 | 2,496 | 70 | 1,747 | 80 | 1,997 | 80 | 1,997 |
| Tartaric Acid | — | — | 20 | 768 | — | — | — | — | — | — | — | — |
| Citric Acid | 20 | 600 | — | — | 10 | 300 | — | — | — | — | — | — |
| Trimellitic Anhydride | — | — | — | — | — | — | 15 | 461 | — | — | — | — |
| Esterification Catalyst/Promoter | | | | | | | | | | | | |
| Tin(II) 2-Ethylhexanoate | — | 20.08 | — | 20.08 | — | 20.08 | — | 18.0 | — | 16.0 | — | 16.6 |
| Gallic Acid | — | 0.8 | — | 0.8 | — | 0.8 | — | — | — | — | — | — |
| Dually Reactive Monomer | | | | | | | | | | | | |
| Acrylic Acid | — | — | — | — | — | — | 6 | 60 | — | — | — | — |
| Raw Material Monomers for Styrenic Resin | | | | | | | Weight Ratio | | | | | |
| Styrene | — | — | — | — | — | — | 84 | 755 | — | — | — | — |
| 2-Ethylhexyl Acrylate | — | — | — | — | — | — | 60 | 144 | — | — | — | — |
| Polymerization Initiator | | | | | | | | | | | | |
| Dibutyl Peroxide | — | — | — | — | — | — | 4 | 36 | — | — | — | — |
| Total Amount of Carboxylic Acid Compound Having Furan Ring and Alcohol Having Furan Ring[1] [X] (% by mol) | 44.4 | | 44.4 | | 44.4 | | 37.8 | | 47.1 | | 44.4 | |
| Softening Point (° C.) | 135.7 | | 142.5 | | 103.4 | | 132.9 | | 149.8 | | 95.4 | |
| Highest Temperature of Endothermic Peak (° C.) | 74.3 | | 75.1 | | 62.9 | | 75.6 | | 80.4 | | 71.7 | |
| Softening Point/Highest Temperature of Endothermic Peak | 1.82 | | 1.90 | | 1.63 | | 1.75 | | 1.86 | | 1.33 | |
| Glass Transition Temperature (° C.) | 68.3 | | 70.3 | | 59.1 | | 72.4 | | 74.4 | | 64.9 | |
| Acid Value (mgKOH/g) | 45.6 | | 30.2 | | 40.1 | | 15.9 | | 10.5 | | 8.8 | |
| Hydroxyl Value (mgKOH/g) | 60.5 | | 85.4 | | 79 | | 30 | | 25.6 | | 40.2 | |
| Number-Average Molecular Weight | 1,800 | | 1,400 | | 2,200 | | 3,300 | | 3,100 | | 1,400 | |

[1] A total amount of the carboxylic acid compound having a furan ring and the alcohol having a furan ring in a total amount of the carboxylic acid component and the alcohol component

A.7 Examples A1 to A12 and A17 to A23 and Comparative Examples A1 and A2

One hundred parts by weight of a resin binder or resin binders as listed in Table A5, 1 part by weight of a negatively chargeable charge control agent "BONTRON E-81" (manufactured by Orient Chemical Co., Ltd.), 5 parts by weight of a colorant "Regal 330R" (manufactured by Cabot Corporation, a carbon black), and 2 parts by weight of a releasing agent "Mitsui Hi-Wax NP055" (manufactured by MITSUI CHEMICALS, INC., a polypropylene wax, melting point: 125° C.) were sufficiently mixed with a Henschel mixer, and thereafter the mixture was melt-kneaded with a unidirectional rotary twin-screw extruder at a roller rotational speed of 200 r/min and a heating temperature inside the roller of 80° C. The melt-kneaded product obtained was cooled and roughly pulverized, and thereafter pulverized with a jet mill, and a pulverized product was classified, to provide toner particles having a volume-median particle size ($D_{50}$) of 8 μm.

To 100 parts by weight of the resulting toner particles was added 1.0 part by weight of a hydrophobic silica "NAX-50" (manufactured by Nihon Aerosil Co., Ltd., a hydrophobic treatment agent: HMDS, average particle size: about 30 nm), and the mixture was blended with a Henschel mixer, to provide each of the toners.

A.8 Example A13

The same procedures as in Example A1 were carried out except that 5 parts by weight of a charge control resin "FCA-701PT" (manufactured by FUJIKURA KASEI CO., LTD., a quaternary ammonium salt group-containing styrene-acrylic copolymer, softening point: 123° C.) was used together with the resin binders, the colorant, and the like, that 1 part by weight of a positively chargeable charge control agent "BONTRON P-51" (manufactured by Orient Chemical Co., Ltd.) was used in place of the negatively chargeable charge control agent, and that 1.0 part by weight of a hydrophobic silica "TG-C243" (manufactured by Cabot Corporation, average particle size: 100 nm, hydrophobic treatment agent: hexamethyldisilazane+octyltriethoxysilane) was used in place of "NAX-50" as an external additive, to provide a toner.

A.9 Examples A14 and A16

The same procedures as in Example A1 were carried out except that 1 part by weight of "LR-147" (manufactured by Nippon Carlit, Ltd.) was used in place of "BONTRON E-81" (manufactured by Orient Chemical Co., Ltd.) as a negatively chargeable charge control agent, that 2 parts by weight of "HNP-9" (manufactured by Nippon Seiro, a paraffin wax, melting point: 80° C.) was used in place of the releasing agent "Mitsui Hi-Wax NP055" as a releasing agent, that 5 parts by weight of a cyan pigment "Toner Cyan BG" (manufactured by Clariant, P. B. 15:3) was used in Example A14, and 6 parts by weight of a yellow pigment "Paliotol Yellow D1155" (manufactured by BASF, P.Y. 185) was used in Example A16, in place of the carbon black "Regal 330R," as a colorant, and that 1.0 part by weight of a hydrophobic silica "R-972" (manufactured by Nihon Aerosil Co., Ltd., average particle size: 16 nm, a hydrophobic treatment agent: dimethyldichlorosilane) was used in place of "NAX-50" as an external additive, to provide each toner.

A.10 Example A15

The same procedures as in Example A1 were carried out except that 1 part by weight of "LR-297" (manufactured by Nippon Carlit, Ltd.) was used in place of "BONTRON E-81" (manufactured by Orient Chemical Co., Ltd.) as a negatively chargeable charge control agent, that 2 parts by weight of "HNP-9" (manufactured by Nippon Seiro, a paraffin wax, melting point: 80° C.) was used in place of "Mitsui Hi-Wax NP055" as a releasing agent, that 1.0 part by weight of a hydrophobic silica "R-972" (manufactured by Nihon Aerosil Co., Ltd., average particle size: 16 nm, a hydrophobic treatment agent: dimethyldichlorosilane) was used in place of "NAX-50" as an external additive, and that 5 parts by weight of a magenta pigment "Super Magenta R" (manufactured by DIC Corporation, P.R. 122) was used in place of the carbon black "Regal 330R" as a colorant, to provide a toner.

A.11 Test Example A1

Low-Temperature Fusing Ability

The resulting toner was loaded on a copy machine "AR-505" (manufactured by Sharp Corporation), of which fuser was modified so that fusing could be carried out outside the machine, provided that the evaluation of Example A13 was made using a modified apparatus of nonmagnetic monocomponent development method printer "HL-2040" (manufactured by Brother Industries Ltd.), to provide unfixed images on paper [Copybond SF-70NA (75 g/m$^2$)] manufactured by Sharp Corporation. While sequentially raising the temperature of a fusing roller from 100° to 240° C. in an increment of 10° C., the unfixed images were subjected to a fusing test at each temperature with a fuser (fusing speed: 390 mm/sec) adjusted so that a total fusing pressure was 40 kgf. "UNICEF Cellophane" tape (MITSUBISHI PENCIL CO., LTD., width: 18 mm, JIS Z-1522) was adhered to the fixed images, and the resulting fixed images were allowed to pass through a fusing roller set at 30° C., and the tape was then removed. The optical reflective densities of the image before adhesion of the tape and after removal of the tape were measured with a reflective densitometer "RD-915" (manufactured by Macbeth Process Measurements Co.). The temperature of a fusing roller at which the percentage of the optical reflective densities (after removal of the tape/before adhesion of the tape×100) initially exceeds 90% is defined as the lowest fusing temperature. The low-temperature fusing ability was evaluated according to the following evaluation criteria. The results are shown in Table A5. Here, the numerical values inside parentheses show found values of the lowest fusing temperature.

[Evaluation Criteria]
A: Lowest fusing temperature being lower than 140° C.;
B: Lowest fusing temperature being 140° C. or higher and lower than 170° C.; and
C: Lowest fusing temperature being 170° C. or higher.

A.12 Test Example A2

Storage Property

Four grams of a toner was allowed to stand for 72 hours under environmental conditions of a temperature of 55° C. and relative humidity of 60%. After allowing the toner to stand, the extent of generation of toner aggregation was visually observed, and the storage property was evaluated in accordance with the following evaluation criteria. The results are shown in Table A5.

[Evaluation Criteria]
A: The aggregation is not found at all even after 72 hours.
B: Although the aggregation is not found after 48 hours, the aggregation is slightly found after 72 hours.
C: Although the aggregation is not found after 48 hours, the aggregation is clearly found after 72 hours.
D: The aggregation is found within 48 hours.

TABLE A5

| | Resin Binder | | | | | | Releasing Agent | Charge Control Agent | Charge Control Resin | External Additive | Low-Temperature Fusing Ability | Storage Property |
|---|---|---|---|---|---|---|---|---|---|---|---|---|
| | Kind | X* | Parts by Wt. | Kind | X* | Parts by Wt. | Colorant | | | | | | |
| Ex. A1 | Resin 1 | 44.4 | 70 | Resin 8 | 33.3 | 30 | Black | NP055 | E-81 | None | NAX-50 | A (125) | A |
| Ex. A2 | Resin 2 | 44.4 | 70 | Resin 8 | 33.3 | 30 | Black | NP055 | E-81 | None | NAX-50 | A (125) | B |
| Ex. A3 | Resin 3 | 44.4 | 70 | Resin 8 | 33.3 | 30 | Black | NP055 | E-81 | None | NAX-50 | B (150) | A |
| Ex. A4 | Resin 4 | 44.4 | 70 | Resin 8 | 33.3 | 30 | Black | NP055 | E-81 | None | NAX-50 | A (135) | A |
| Ex. A5 | Resin 5 | 44.4 | 70 | Resin 8 | 33.3 | 30 | Black | NP055 | E-81 | None | NAX-50 | A (135) | A |
| Ex. A6 | Resin 6 | 44.4 | 70 | Resin 8 | 33.3 | 30 | Black | NP055 | E-81 | None | NAX-50 | A (135) | A |
| Ex. A7 | Resin 7 | 22.2 | 70 | Resin 8 | 33.3 | 30 | Black | NP055 | E-81 | None | NAX-50 | A (135) | B |
| Ex. A8 | — | — | — | Resin 8 | 33.3 | 100 | Black | NP055 | E-81 | None | NAX-50 | B (155) | A |
| Ex. A9 | Resin 1 | 44.4 | 100 | — | — | — | Black | NP055 | E-81 | None | NAX-50 | A (115) | B |
| Ex. A10 | Resin 12 | 0 | 70 | Resin 8 | 33.3 | 30 | Black | NP055 | E-81 | None | NAX-50 | B (150) | B |
| Ex. A11 | Resin 9 | 44.4 | 70 | Resin 8 | 33.3 | 30 | Black | NP055 | E-81 | None | NAX-50 | B (140) | A |
| Ex. A12 | Resin 10 | 55.6 | 70 | Resin 8 | 33.3 | 30 | Black | NP055 | E-81 | None | NAX-50 | A (115) | B |
| Ex. A13 | Resin 1 | 44.4 | 70 | Resin 8 | 33.3 | 30 | Black | NP055 | P-51 | FCA-701PT | TG-C243 | A (125) | A |
| Ex. A14 | Resin 1 | 44.4 | 70 | Resin 8 | 33.3 | 30 | Cyan | HNP-9 | LR-147 | None | R-972 | A (120) | A |
| Ex. A15 | Resin 1 | 44.4 | 70 | Resin 8 | 33.3 | 30 | Magenta | HNP-9 | LR-297 | None | R-972 | A (120) | A |
| Ex. A16 | Resin 1 | 44.4 | 70 | Resin 8 | 33.3 | 30 | Yellow | HNP-9 | LR-147 | None | R-972 | A (120) | A |
| Ex. A17 | Resin 13 | 28.6 | 60 | Resin 8 | 33.3 | 40 | Black | NP055 | E-81 | None | NAX-50 | A (115) | B |
| Ex. A18 | Resin 14 | 44.4 | 100 | — | — | — | Black | NP055 | E-81 | None | NAX-50 | A (110) | B |

TABLE A5-continued

| | Resin Binder | | | | | Colorant | Releasing Agent | Charge Control Agent | Charge Control Resin | External Additive | Low-Temperature Fusing Ability | Storage Property |
|---|---|---|---|---|---|---|---|---|---|---|---|---|
| | Kind | X* | Parts by Wt. | Kind | X* | Parts by Wt. | | | | | | |
| Ex. A19 | Resin 15 | 44.4 | 100 | — | — | — | Black | NP055 | E-81 | None | NAX-50 | A (110) | B |
| Ex. A20 | Resin 16 | 44.4 | 50 | Resin 18 | 44.4 | 50 | Black | NP055 | E-81 | None | NAX-50 | A (135) | A |
| Ex. A21 | Resin 17 | 44.4 | 50 | Resin 18 | 44.4 | 50 | Black | NP055 | E-81 | None | NAX-50 | A (140) | A |
| Ex. A22 | Resin 19 | 37.8 | 100 | — | — | — | Black | NP055 | E-81 | None | NAX-50 | A (145) | A |
| Ex. A23 | Resin 20 | 47.1 | 50 | Resin 21 | 44.4 | 50 | Black | NP055 | E-81 | None | NAX-50 | A (135) | A |
| Comp. Ex. A1 | Resin 11 | 0 | 100 | — | — | — | Black | NP055 | E-81 | None | NAX-50 | C (170) | B |
| Comp. Ex. A2 | Resin 12 | 0 | 100 | — | — | — | Black | NP055 | E-81 | None | NAX-50 | B (160) | C |

*X: A total amount of the carboxylic acid compound having a furan ring and the alcohol having a furan ring in a total amount of the carboxylic acid component and the alcohol component (% by mol)

It can be seen from the above results that the toners of Examples A1 to A23 are excellent in both low-temperature fusing ability and storage property, as compared to the toners of Comparative Examples A1 and A2.

Example B

B.1 Production Example 1 of Resins

Resins 1, 2, 4 to 7, and 9 to 17

A 5-liter four-neck flask equipped with a thermometer, a stainless steel stirring rod, a reflux condenser, and a nitrogen inlet tube was charged with raw material monomers and an esterification catalyst, as listed in Tables B1 to B4, and the contents were heated in a mantle heater to 180° C. in a nitrogen atmosphere, and thereafter heated to 210° C. over 5 hours. Thereafter, having confirmed that a reaction percentage at 210° C. reached 95% or higher, the reaction mixture was subjected to a reaction at 40 kPa until a softening point as listed in Tables B1 to B4 was reached, to provide each of amorphous polyesters (Resins 1, 2, 4 to 7, and 9 to 17). Here, the reaction percentage as used herein means a value defined by a value calculated by: [amount of generated water in reaction/theoretical amount of generated water]×100.

B.2 Production Example 2 of Resins

Resins 3 and 19

A 5-liter four-neck flask equipped with a thermometer, a stainless steel stirring rod, a reflux condenser, and a nitrogen inlet tube was charged with raw material monomers and an esterification catalyst, as listed in Table B1 or B4, and the contents were heated in a mantle heater to 235° C. in a nitrogen atmosphere, and the reaction mixture was subjected to a reaction at 235° C. for 10 hours. Thereafter, the reaction mixture was subjected to a reaction at 235° C. and 8 kPa for 1 hour, the mixture was cooled to 210° C., and the reaction mixture was subjected to a reaction at 20 kPa until a softening point as listed in Table B1 or B4 was reached, to provide each of amorphous polyesters (Resins 3 and 19).

B.3 Production Example 3 of Resins

Resins 8 and 18

A 5-liter four-neck flask equipped with a thermometer, a stainless steel stirring rod, a reflux condenser, and a nitrogen inlet tube was charged with raw material monomers other than a given amount of trimellitic anhydride, and an esterification catalyst, as listed in Table B2 or B4, and the contents were heated in a mantle heater to 180° C. in a nitrogen atmosphere, and thereafter heated to 210° C. over 5 hours. Thereafter, having confirmed that a reaction percentage at 210° C. reached 95% or higher, trimellitic anhydride was supplied thereto in a given amount as listed in Table B2 or B4. The mixture was subjected to a reaction at normal pressure for 1 hour, and subjected to a reaction at 40 kPa until a desired softening point as listed in Table B2 or B4 was reached, to provide each of amorphous polyesters (Resins 8 and 18).

TABLE B1

| | Resin 1 Amount Used | | Resin 2 Amount Used | | Resin 3 Amount Used | | Resin 4 Amount Used | | Resin 5 Amount Used | |
|---|---|---|---|---|---|---|---|---|---|---|
| | molar ratio | g | molar ratio | g | molar ratio | g | molar ratio | g | molar ratio | g |
| Raw Material Monomers | | | | | | | | | | |
| Alcohol Component | | | | | | | | | | |
| 1,2-Propanediol | 100 | 1,520 | — | — | — | — | 100 | 1,520 | 100 | 1,520 |
| 2,3-Butanediol | — | — | 100 | 1,800 | — | — | — | — | — | — |
| BPA-PO[1)] | — | — | — | — | 70 | 2,450 | — | — | — | — |
| BPA-EO[2)] | — | — | — | — | 30 | 975 | — | — | — | — |
| Carboxylic Acid Component | | | | | | | | | | |
| Furan-2,5-Dicarboxylic Acid | 60 | 1,872 | 60 | 1,872 | 60 | 936 | — | — | — | — |
| Furan-2,4-Dicarboxylic Acid | — | — | — | — | — | — | 60 | 1,872 | — | — |
| Ethyl Furan-2,5-Dicarboxylate | — | — | — | — | — | — | — | — | 60 | 2,544 |
| Dodecenylsuccinic Anhydride | 20 | 1,072 | 20 | 1,072 | 20 | 536 | 20 | 804 | 20 | 1,072 |

TABLE B1-continued

|  | Resin 1 Amount Used | | Resin 2 Amount Used | | Resin 3 Amount Used | | Resin 4 Amount Used | | Resin 5 Amount Used | |
| --- | --- | --- | --- | --- | --- | --- | --- | --- | --- | --- |
|  | molar ratio | g | molar ratio | g | molar ratio | g | molar ratio | g | molar ratio | g |
| Esterification Catalyst/Promoter | | | | | | | | | | |
| Tin(II) 2-Ethylhexanoate | — | 22.3 | — | 23.7 | — | 24.5 | — | 21.0 | — | 25.7 |
| Total Amount of Carboxylic Acid Compound Having Furan Ring and Alcohol Having Furan Ring [X][3] (% by mol) | 33.3 | | 33.3 | | 33.3 | | 33.3 | | 33.3 | |
| Content of Total Amount of Aliphatic Carboxylic Acid Compound Having 6 to 40 Carbon Atoms and Aliphatic Alcohol Having 6 to 40 Carbon Atoms [Y][4] (% by mol) | 11.1 | | 11.1 | | 11.1 | | 11.1 | | 11.1 | |
| Softening Point (° C.) | 101.6 | | 96.9 | | 104.4 | | 103.3 | | 105.1 | |
| Highest Temperature of Endothermic Peak (° C.) | 62.3 | | 59.6 | | 61.0 | | 62.4 | | 62.8 | |
| Softening Point/Highest Temperature of Endothermic Peak | 1.63 | | 1.63 | | 1.71 | | 1.66 | | 1.67 | |
| Glass Transition Temperature (° C.) | 58.2 | | 55.1 | | 57.6 | | 57.1 | | 58.9 | |
| Acid Value (mgKOH/g) | 9.5 | | 12.3 | | 9.2 | | 9 | | 10.9 | |
| Hydroxyl Value (mgKOH/g) | 42.3 | | 54.6 | | 45.2 | | 48.2 | | 54.5 | |
| Number-Average Molecular Weight | 1,700 | | 1,200 | | 2,000 | | 1,800 | | 1,600 | |

[1] Polyoxypropylene(2.2)-2,2-bis(4-hydroxyphenyl)propane
[2] Polyoxyethylene(2.2)-2,2-bis(4-hydroxyphenyl)propane
[3] Content in a total amount of the carboxylic acid component and the alcohol component
[4] Content in a total amount of the carboxylic acid component and the alcohol component

TABLE B2

|  | Resin 6 Amount Used | | Resin 7 Amount Used | | Resin 8 Amount Used | | Resin 9 Amount Used | | Resin 10 Amount Used | |
| --- | --- | --- | --- | --- | --- | --- | --- | --- | --- | --- |
|  | molar ratio | g | molar ratio | g | molar ratio | g | molar ratio | g | molar ratio | g |
| Raw Material Monomers Alcohol Component | | | | | | | | | | |
| 1,2-Propanediol | 100 | 1,520 | 100 | 1,520 | 100 | 1,520 | 100 | 1,520 | 100 | 1,520 |
| Carboxylic Acid Component | | | | | | | | | | |
| Furan-2,5-Dicarboxylic Acid | 48 | 1,498 | 40 | 1,248 | 40 | 1,248 | 60 | 1,872 | 60 | 1,872 |
| Furan-2-Carboxylic Acid | 32 | 717 | — | — | — | — | — | — | — | — |
| Terephthalic Acid | — | — | 20 | 664 | — | — | — | — | — | — |
| Dodecenylsuccinic Anhydride | 20 | 1,072 | 20 | 1,072 | 20 | 1,072 | — | — | — | — |
| Adipic Acid | — | — | — | — | — | — | 20 | 438 | — | — |
| Sebacic Acid | — | — | — | — | — | — | — | — | 20 | 808 |
| Trimellitic Anhydride | — | — | — | — | 20 | 768 | — | — | — | — |
| Esterification Catalyst/Promoter | | | | | | | | | | |
| Tin(II) 2-Ethylhexanoate | — | 24.0 | — | 22.5 | — | 23.0 | — | 19.2 | — | 21.0 |
| Total Amount of Carboxylic Acid Compound Having Furan Ring and Alcohol Having Furan Ring [X][1] (% by mol) | 40.0 | | 22.2 | | 22.2 | | 33.3 | | 33.3 | |
| Content of Total Amount of Aliphatic Carboxylic Acid Compound Having 6 to 40 Carbon Atoms and Aliphatic Alcohol Having 6 to 40 Carbon Atoms [Y][2] (% by mol) | 10.0 | | 11.1 | | 11.1 | | 11.1 | | 11.1 | |
| Softening Point (° C.) | 106.6 | | 104.0 | | 132.4 | | 104.4 | | 103.7 | |
| Highest Temperature of Endothermic Peak (° C.) | 63.9 | | 60.1 | | 67.8 | | 56.9 | | 53.3 | |
| Softening Point/Highest Temperature of Endothermic Peak | 1.67 | | 1.73 | | 1.95 | | 1.83 | | 1.95 | |
| Glass Transition Temperature (° C.) | 58.7 | | 56.3 | | 62.9 | | 52.3 | | 48.4 | |
| Acid Value (mgKOH/g) | 7.9 | | 10.4 | | 13.6 | | 18.5 | | 5.8 | |
| Hydroxyl Value (mgKOH/g) | 50.3 | | 50.5 | | 44.9 | | 47.7 | | 64.7 | |
| Number-Average Molecular Weight | 1,900 | | 2,100 | | 3,100 | | 2,200 | | 2,300 | |

[1] Content in a total amount of the carboxylic acid component and the alcohol component
[2] Content in a total amount of the carboxylic acid component and the alcohol component

TABLE B3

| | Resin 11 Amount Used | | Resin 12 Amount Used | | Resin 13 Amount Used | | Resin 14 Amount Used | | Resin 15 Amount Used | | Resin 16 Amount Used | |
|---|---|---|---|---|---|---|---|---|---|---|---|---|
| | molar ratio | g | molar ratio | g | molar ratio | g | molar ratio | g | molar ratio | g | molar ratio | g |
| Raw Material Monomers Alcohol Component | | | | | | | | | | | | |
| 1,2-Propanediol | 100 | 1,140 | 100 | 1,140 | 100 | 1,140 | 100 | 1,140 | 80 | 1,216 | 80 | 912 |
| 5-Hydroxymethylfurfryl Alcohol | — | — | — | — | — | — | — | — | 40 | 1,024 | — | — |
| 1,6-Hexanediol | — | — | — | — | — | — | — | — | — | — | 20 | 236 |
| Carboxylic Acid Component | | | | | | | | | | | | |
| Furan-2,5-Dicarboxylic Acid | 60 | 1,872 | 60 | 936 | 78 | 1,217 | 20 | 312 | — | — | — | — |
| Terephtalic Acid | — | — | — | — | — | — | — | — | 60 | 1,328 | 80 | 1,248 |
| Dodecenylsuccinic Anhydride | — | — | — | — | 2 | 53.6 | 60 | 1,608 | 20 | 715 | — | — |
| Stearic Acid | 20 | 853.5 | — | — | — | — | — | — | — | — | — | — |
| Dimeric Acid (Number of Carbon Atoms: 36)[1] | — | — | 20 | 1,120 | — | — | — | — | — | — | — | — |
| Esterification Catalyst/Promoter | | | | | | | | | | | | |
| Tin(II) 2-Ethylhexanoate | — | 19.3 | — | 16.0 | — | 12.1 | — | 15.3 | — | 12.2 | — | 12 |
| Gallic Acid | — | — | — | — | — | 0.6 | — | — | — | — | — | 0.6 |
| Total Amount of Carboxylic Acid Compound Having Furan Ring and Alcohol Having Furan Ring [X][2] (% by mol) | 33.3 | | 33.3 | | 43.3 | | 11.1 | | 20.0 | | 44.4 | |
| Content of Total Amount of Aliphatic Carboxylic Acid Compound Having 6 to 40 Carbon Atoms and Aliphatic Alcohol Having 6 to 40 Carbon Atoms [Y][3] (% by mol) | 11.1 | | 11.1 | | 1.1 | | 33.3 | | 10.0 | | 11.1 | |
| Softening Point (° C.) | 95.4 | | 96.2 | | 103.3 | | 105.8 | | 100.6 | | 108.3 | |
| Highest Temperature of Endothermic Peak (° C.) | 50.0 | | 49.9 | | 70.5 | | 54.9 | | 66.3 | | 59.2 | |
| Softening Point/Highest Temperature of Endothermic Peak | 1.91 | | 1.93 | | 1.47 | | 1.93 | | 1.52 | | 1.83 | |
| Glass Transition Temperature (° C.) | 45.1 | | 44.2 | | 66.4 | | 50.3 | | 60.6 | | 52.7 | |
| Acid Value (mgKOH/g) | 6.6 | | 6.4 | | 2.3 | | 11.2 | | 4.3 | | 3.6 | |
| Hydroxyl Value (mgKOH/g) | 70.8 | | 65.6 | | 71.2 | | 68.4 | | 68.2 | | 69.9 | |
| Number-Average Molecular Weight | 1,400 | | 1,500 | | 1,600 | | 1,700 | | 1,600 | | 2,200 | |

[1] "TSUNODYME" manufactured by TSUNO CO., LTD.
[2] Content in a total amount of the carboxylic acid component and the alcohol component
[3] Content in a total amount of the carboxylic acid component and the alcohol component

TABLE B4

| | Resin 17 Amount Used | | Resin 18 Amount Used | | Resin 19 Amount Used | |
|---|---|---|---|---|---|---|
| | molar ratio | g | molar ratio | g | molar ratio | g |
| Raw Material Monomers Alcohol Component | | | | | | |
| 1,2-Propanediol | 100 | | 100 | | 100 | 1,140 |
| BPA-PO[1] | — | — | — | — | 70 | 2,450 |
| BPA-EO[2] | — | — | — | — | 30 | 975 |
| Carboxylic Acid Component | | | | | | |
| Terephthalic Acid | 60 | 996 | 40 | 664 | 60 | 996 |
| Dodecenylsuccinic Anhydride | 20 | 536 | 20 | 536 | 20 | 536 |
| Trimellitic Anhydride | — | — | 20 | 576 | — | — |
| Esterification Catalyst/Promoter | | | | | | |
| Tin(II) 2-Ethylhexanoate | — | 13.4 | — | 14.6 | — | 24.8 |
| Total Amount of Carboxylic Acid Compound Having Furan Ring and Alcohol Having Furan Ring [X][3] (% by mol) | 0.0 | | 0.0 | | 0.0 | |
| Content of Total Amount of Aliphatic Carboxylic Acid Compound Having 6 to 40 Carbon Atoms and Aliphatic Alcohol Having 6 to 40 Carbon Atoms [Y][4] (% by mol) | 11.1 | | 11.1 | | 11.1 | |
| Softening Point (° C.) | 103.2 | | 128.6 | | 102.4 | |
| Highest Temperature of Endothermic Peak (° C.) | 58.4 | | 67.9 | | 1.74 | |
| Softening Point/Highest Temperature of Endothermic Peak | 1.77 | | 1.89 | | 58.9 | |
| Glass Transition Temperature (° C.) | 52.9 | | 60.4 | | 52.1 | |
| Acid Value (mgKOH/g) | 2.3 | | 11.2 | | 4.7 | |
| Hydroxyl Value (mgKOH/g) | 71.2 | | 68.4 | | 70.1 | |
| Number-Average Molecular Weight | 1,800 | | 3,400 | | 2,400 | |

[1] Polyoxypropylene(2.2)-2,2-bis(4-hydroxyphenyl)propane
[2] Polyoxyethylene(2.2)-2,2-bis(4-hydroxyphenyl)propane
[3] Content in a total amount of the carboxylic acid component and the alcohol component
[4] Content in a total amount of the carboxylic acid component and the alcohol component

B.4 Examples B1 to B16 and Comparative Examples B1 and B2

One hundred parts by weight of a resin binder or resin binders as listed in Table B5, 5 parts by weight of a colorant "Regal 330R" (manufactured by Cabot Corporation, a carbon black), 2 parts by weight of a releasing agent "Mitsui Hi-Wax NP055" (manufactured by MITSUI CHEMICALS, INC., a polypropylene wax, melting point: 125° C.), and 1 part by weight of a negatively chargeable charge control agent "BONTRON E-81" (manufactured by Orient Chemical Co., Ltd.) were sufficiently mixed with a Henschel mixer, and thereafter the mixture was melt-kneaded with a unidirectional rotary twin-screw extruder at a roller rotational speed of 200 r/min and a heating temperature inside the roller of 80° C. The melt-kneaded product obtained was cooled and roughly pulverized, and thereafter pulverized with a jet mill, and a pulverized product was classified, to provide toner particles having a volume-median particle size ($D_{50}$) of 8 μm.

To 100 parts by weight of the resulting toner particles was added 1.0 part by weight of a hydrophobic silica "NAX-50" (manufactured by Nihon Aerosil Co., Ltd., a hydrophobic treatment agent: HMDS, average particle size: about 30 nm), and the mixture was blended with a Henschel mixer, to provide each of the toners.

B.5 Example B17

The same procedures as in Example B1 were carried out except that 5 parts by weight of a charge control resin "FCA-701PT" (manufactured by FUJIKURA KASEI CO., LTD., a quaternary ammonium salt group-containing styrene-acrylic resin, softening point: 123° C.) was together with the resin binders, the colorant, and the like, that 1 part by weight of a positively chargeable charge control agent "BONTRON P-51" (manufactured by Orient Chemical Co., Ltd.) was used in place of the negatively chargeable charge control agent, and that 1.0 part by weight of a hydrophobic silica "TG-C243" (manufactured by Cabot Corporation, average particle size: 100 nm, hydrophobic treatment agent: hexamethyldisilazane+octyltriethoxysilane) was used in place of "NAX-50" as an external additive, to provide a toner.

B.6 Examples B18 and B20

The same procedures as in Example B1 were carried out except that 5 parts by weight of a cyan pigment "Toner Cyan BG" (manufactured by Clariant, P. B. 15:3) was used in Example B18, and 6 parts by weight of a yellow pigment "Paliotol Yellow D1155" (manufactured by BASF, P. Y. 185) was used in Example B20, in place of the carbon black "Regal 330R" as a colorant, that 2 parts by weight of "HNP-9" (manufactured by Nippon Seiro, a paraffin wax, melting point: 80° C.) was used in place of "Mitsui Hi-Wax NP055" as a releasing agent, that 1 part by weight of "LR-147" (manufactured by Nippon Carlit, Ltd.) was used in place of "BONTRON E-81" (manufactured by Orient Chemical Co., Ltd.) as a negatively chargeable charge control agent, and that 1.0 part by weight of a hydrophobic silica "R-972" (manufactured by Nihon Aerosil Co., Ltd., average particle size: 16 nm, a hydrophobic treatment agent: dimethyldichlorosilane) was used in place of "NAX-50" as an external additive, to provide each toner.

B.7 Example B19

The same procedures as in Example B1 were carried out except that 5 parts by weight of a magenta pigment "Super Magenta R" (manufactured by DIC Corporation, P.R. 122) was used in place of the carbon black "Regal 330R" as a colorant, that 2 parts by weight of "HNP-9" (manufactured by Nippon Seiro, a paraffin wax, melting point: 80° C.) was used in place of "Mitsui Hi-Wax NP055" as a releasing agent, that 1 part by weight of "LR-297" (manufactured by Nippon Carlit, Ltd.) was used in place of "BONTRON E-81" (manufactured by Orient Chemical Co., Ltd.) as a negatively chargeable charge control agent, and that 1.0 part by weight of a hydrophobic silica "R-972" (manufactured by Nihon Aerosil Co., Ltd., average particle size: 16 nm, a hydrophobic treatment agent: dimethyldichlorosilane) was used in place of "NAX-50" as an external additive, to provide a toner.

B.8 Example B21

Preparation of Resin Dispersion

To a 5-L vessel equipped with a stirrer, a reflux condenser, a dropping funnel, a thermometer and a nitrogen inlet tube, 600 g of methyl ethyl ketone was supplied, and 140 g of Resin 1 and 60 g of Resin 8, as listed in Table B5, were added thereto at room temperature to dissolve. To the resulting solution was added 3.9 g of triethylamine (one equivalent to the acid value of the resin binders) to neutralize the solution, and subsequently 2,000 g of ion-exchanged water was added thereto. Thereafter, methyl ethyl ketone was distilled off from the mixture at a stirring rate of 250 r/min at a temperature of 50° C. or lower under a reduced pressure, to provide a self-dispersible aqueous dispersion of resin particles (resin content: 9.6% by weight (on a solid basis)). Polyester particles (primary particles) dispersed in the resulting resin dispersion had an average particle size (volume-median particle size) of 0.3 μm.

[Preparation of Colorant Dispersion]

Fifty grams of a cyan pigment "Toner Cyan BG" (manufactured by Clariant, P. B. 15:3), 5 g of a nonionic surfactant (EMULGEN 150, manufactured by KAO Corporation, polyoxyethylene lauryl ether, HLB: 18.4, cloud point: 100° C. or higher) and 200 g of ion-exchanged water were mixed, and copper phthalocyanine was dissolved. The mixture was dispersed for 10 minutes with a homogenizer to provide a colorant dispersion.

[Preparation of Releasing Agent Dispersion]

Fifty grams of "HNP-9" (manufactured by Nippon Seiro, a paraffin wax, melting point: 80° C.), 5 g of a cationic surfactant (SANISOL B50, manufactured by KAO Corporation) and 200 g of ion-exchanged water were heated to 95° C., and the paraffin wax was dispersed with a homogenizer. Thereafter, the mixture was subjected to a dispersion treatment with a pressure jetting homogenizer, to provide a releasing agent dispersion in which the paraffin wax was dispersed in an average particle size of 550 nm.

[Preparation of Charge Control Agent Dispersion]

Fifty grams of a charge control agent "LR-147" (manufactured by Nippon Carlit, Ltd.), 5 g of a nonionic surfactant (EMULGEN 150, manufactured by KAO Corporation, polyoxyethylene lauryl ether, HLB: 18.4, cloud point: 100° C. or higher) and 200 g of ion-exchanged water were mixed, and the mixture was dispersed for 10 minutes using glass beads with a sand grinder, to prepare a charge control agent dispersion in which the charge control agent was dispersed in an average particle size of 500 nm.

[Aggregating Step]

Four-hundred and ninety grams of the resulting resin particle dispersion, 20 g of the colorant dispersion, 15 g of the releasing agent dispersion, 7 g of the charge control agent dispersion and 2 g of the cationic surfactant (SANISOL B50, manufactured by KAO Corporation) were mixed in a round-shaped stainless steel flask with a homogenizer to disperse. Thereafter, the dispersion was heated to 48° C., while stirring the contents inside the flask in a heating oil bath. Further, after the dispersion was kept at 48° C. for 1 hour, it was confirmed that aggregated particles having a weight-average particle size of 6.0 µm were formed. The solid content in this step was 8.8% by weight, and a pH was 6.8.

[Coalescing Step]

Three grams of an anionic surfactant (PELEX SS-L, manufactured by KAO Corporation) was added to the aggregated particle dispersion, and thereafter the above-mentioned stainless steel flask was equipped with a reflux tube. The dispersion was heated to 80° C. at a rate of 5° C./min while continuously stirring, and kept thereat for 5 hours, to coalesce and fuse the aggregated particles. Thereafter, the coalesced particles were cooled, filtered, and sufficiently washed with ion-exchanged water and dried. The resulting colored powder of fine resin particles had a volume-median particle size ($D_{50}$) of 6.3 µm.

[Surface-Treating Step]

To 100 parts by weight of the resulting colored powder of fine resin particles was added 1.0 part by weight of a hydrophobic silica "R-972" (manufactured by Nihon Aerosil Co., Ltd., average particle size: 16 nm, a hydrophobic treatment agent: dimethyldichlorosilane), and the mixture was mixed with a Henschel mixer and subjected to an external addition treatment, to provide a cyan toner.

B.9 Example B22

The same procedures as in Example B21 were carried out except that the resin binders are changed to 70 g of Resin 3 and 30 g of Resin 8, to provide a cyan toner. It was confirmed that aggregated particles of which emulsified particles had a weight-average particle size of 0.2 µm were formed, and the solid content in this state was 9.8% by weight, and a pH was 6.7.

B.10 Test Example B1

Low-Temperature Fusing Ability

The resulting toner was loaded on a copy machine "AR-505" (manufactured by Sharp Corporation), of which fuser was modified so that fusing could be carried out outside the machine, provided that the evaluation of Example B17 was made using a modified apparatus of nonmagnetic monocomponent development method printer "HL-2040" (manufactured by Brother Industries Ltd.), and a lowest fusing temperature was measured, and the low-temperature fusing ability was evaluated, in the same manner as in Test Example A1. The results are shown in Table B5. Here, the numerical values inside parentheses show found values of the lowest fusing temperature.

B.11 Test Example B2

Storage Property

Four grams of a toner was placed in a cylindrical container having a radius of 12 mm, and allowed to stand for 72 hours under environmental conditions of a temperature of 55° C. and relative humidity of 60%. After allowing the toner to stand, the toner was taken out of the container, and the extent of generation of toner aggregation was visually observed, and the storage property was evaluated in accordance with the following evaluation criteria. The results are shown in Table B5.

[Evaluation Criteria]
A: The aggregation is not found at all even after 72 hours.
B: Although the aggregation is not found after 48 hours, the aggregation is found after 72 hours.
C: The aggregation is found after 48 hours.

B.12 Test Example B3

Durability

A toner was loaded to a printer "PAGEPRESTO N-4" (manufactured by CASIO COMPUTER CO., LTD., fusing: contact-fusing method, development method: nonmagnetic monocomponent development method, diameter of developer roller: 2.3 cm), and printing was conducted continuously on obliquely striped patterns having a print coverage of 5.5% under the environmental conditions of a temperature of 32° C. and humidity of 85%. During the course of printing, black solid images were printed for every 500 sheets, and the presence or absence of the lines on the formed images was confirmed. At the point where the generation of the lines was confirmed, printing was stopped. The test was conducted up to 5,000 sheets at the maximum. Durability was evaluated by defining the number of printed sheets at the point where the generation of lines was visually confirmed on the images as the number of sheets at which lines were generated by fusion or fixing of toner on a developer roller, in accordance with the following evaluation criteria. In other words, it can be judged that the larger the number of sheets without generation of lines, the higher the durability of toner. The results are shown in Table B5. Here, the numerical figures inside parentheses in the table show the number of sheets printed out to a point where lines for durability were observed.

[Evaluation Criteria]
A: No lines are generated up until printing 5,000 sheets.
B: Lines are generated on printing 2,000 sheets or more and less than 5,000 sheets.
C: Lines are generated on printing less than 2,000 sheets.

TABLE B5

|  | Resin | | | | | Resin | | | | | |
|---|---|---|---|---|---|---|---|---|---|---|---|
|  | Kind | X | Y | Z | Parts by Wt. | Kind | X | Y | Z | Parts by Wt. | Colorant |
| Ex. B1 | Resin 1 | 33.3 | 11.1 | 0.33 | 70 | Resin 8 | 22.2 | 11.1 | 0.50 | 30 | Black |
| Ex. B2 | Resin 2 | 33.3 | 11.1 | 0.33 | 70 | Resin 8 | 22.2 | 11.1 | 0.50 | 30 | Black |
| Ex. B3 | Resin 3 | 33.3 | 11.1 | 0.33 | 70 | Resin 8 | 22.2 | 11.1 | 0.50 | 30 | Black |
| Ex. B4 | Resin 4 | 33.3 | 11.1 | 0.33 | 70 | Resin 8 | 22.2 | 11.1 | 0.50 | 30 | Black |
| Ex. B5 | Resin 5 | 33.3 | 11.1 | 0.33 | 70 | Resin 8 | 22.2 | 11.1 | 0.50 | 30 | Black |
| Ex. B6 | Resin 6 | 40.0 | 10.0 | 0.25 | 70 | Resin 8 | 22.2 | 11.1 | 0.50 | 30 | Black |
| Ex. B7 | Resin 7 | 22.2 | 11.1 | 0.50 | 70 | Resin 8 | 22.2 | 11.1 | 0.50 | 30 | Black |

TABLE B5-continued

| | | X | Y | Z | | | X | Y | Z | | |
|---|---|---|---|---|---|---|---|---|---|---|---|
| Ex. B8 | — | — | — | — | — | Resin 8 | 22.2 | 11.1 | 0.50 | 100 | Black |
| Ex. B9 | Resin 9 | 33.3 | 11.1 | 0.33 | 70 | Resin 8 | 22.2 | 11.1 | 0.50 | 30 | Black |
| Ex. B10 | Resin 10 | 33.3 | 11.1 | 0.33 | 70 | Resin 8 | 22.2 | 11.1 | 0.50 | 30 | Black |
| Ex. B11 | Resin 11 | 33.3 | 11.1 | 0.33 | 70 | Resin 8 | 22.2 | 11.1 | 0.50 | 30 | Black |
| Ex. B12 | Resin 12 | 33.3 | 11.1 | 0.33 | 70 | Resin 8 | 22.2 | 11.1 | 0.50 | 30 | Black |
| Ex. B13 | Resin 13 | 43.3 | 1.1 | 0.03 | 70 | Resin 8 | 22.2 | 11.1 | 0.50 | 30 | Black |
| Ex. B14 | Resin 14 | 11.1 | 33.3 | 3.00 | 70 | Resin 8 | 22.2 | 11.1 | 0.50 | 30 | Black |
| Ex. B15 | Resin 15 | 20.0 | 10.0 | 0.50 | 70 | Resin 8 | 22.2 | 11.1 | 0.50 | 30 | Black |
| Ex. B16 | Resin 16 | 44.4 | 11.1 | 0.25 | 70 | Resin 8 | 22.2 | 11.1 | 0.50 | 30 | Black |
| Ex. B17 | Resin 1 | 33.3 | 11.1 | 0.33 | 70 | Resin 8 | 22.2 | 11.1 | 0.50 | 30 | Black |
| Ex. B18 | Resin 1 | 33.3 | 11.1 | 0.33 | 70 | Resin 8 | 22.2 | 11.1 | 0.50 | 30 | Cyan |
| Ex. B19 | Resin 1 | 33.3 | 11.1 | 0.33 | 70 | Resin 8 | 22.2 | 11.1 | 0.50 | 30 | Magenta |
| Ex. B20 | Resin 1 | 33.3 | 11.1 | 0.33 | 70 | Resin 8 | 22.2 | 11.1 | 0.50 | 30 | Yellow |
| EX. B21 | Resin 1 | 33.3 | 11.1 | 0.33 | 70 | Resin 8 | 22.2 | 11.1 | 0.50 | 30 | Cyan |
| Ex. B22 | Resin 3 | 33.3 | 11.1 | 0.33 | 70 | Resin 8 | 22.2 | 11.1 | 0.50 | 30 | Cyan |
| Comp. Ex. B1 | Resin 17 | 0 | 11.1 | — | 70 | Resin 18 | — | 11.1 | 0 | 30 | Black |
| Comp. Ex. B2 | Resin 19 | 0 | 11.1 | — | 70 | Resin 18 | — | 11.1 | 0 | 30 | Black |

| | Releasing Agent | Charge Control Agent | Charge Control Resin | External Additive | Low-Temp. Fusing Ability | Storage Property | Durability |
|---|---|---|---|---|---|---|---|
| Ex. B1 | NP055 | E-81 | None | NAX-50 | A (120) | A | A (8000) |
| Ex. B2 | NP055 | E-81 | None | NAX-50 | A (140) | A | B (4000) |
| Ex. B3 | NP055 | E-81 | None | NAX-50 | B (150) | A | A (7500) |
| Ex. B4 | NP055 | E-81 | None | NAX-50 | A (120) | A | A (7500) |
| Ex. B5 | NP055 | E-81 | None | NAX-50 | A (120) | A | A (7500) |
| Ex. B6 | NP055 | E-81 | None | NAX-50 | A (120) | B | A (6000) |
| Ex. B7 | NP055 | E-81 | None | NAX-50 | A (130) | B | A (6500) |
| Ex. B8 | NP055 | E-81 | None | NAX-50 | B (160) | A | A (8500) |
| Ex. B9 | NP055 | E-81 | None | NAX-50 | A (140) | A | B (4500) |
| Ex. B10 | NP055 | E-81 | None | NAX-50 | A (130) | B | A (5000) |
| Ex. B11 | NP055 | E-81 | None | NAX-50 | A (140) | B | A (5500) |
| Ex. B12 | NP055 | E-81 | None | NAX-50 | A (130) | B | A (5500) |
| Ex. B13 | NP055 | E-81 | None | NAX-50 | A (130) | A | B (4000) |
| Ex. B14 | NP055 | E-81 | None | NAX-50 | A (130) | B | A (6000) |
| Ex. B15 | NP055 | E-81 | None | NAX-50 | A (120) | B | A (5500) |
| Ex. B16 | NP055 | E-84 | None | NAX-50 | A (130) | A | B (3000) |
| Ex. B17 | NP055 | P-51 | FCA-701PT | TG-C243 | A (120) | A | A (7000) |
| Ex. B18 | HNP-9 | LR-147 | None | R-972 | A (120) | A | A (8000) |
| Ex. B19 | HNP-9 | LR-297 | None | R-972 | A (120) | A | A (8000) |
| Ex. B20 | HNP-9 | LR-147 | None | R-972 | A (120) | A | A (8000) |
| EX. B21 | HNP-9 | LR-147 | None | R-972 | A (120) | A | B (4500) |
| Ex. B22 | HNP-9 | LR-147 | None | R-972 | B (150) | A | B (4500) |
| Comp. Ex. B1 | NP055 | E-81 | None | NAX-50 | B (160) | C | B (3000) |
| Comp. Ex. B2 | NP055 | E-81 | None | NAX-50 | C (180) | C | B (3000) |

Note)
X: Content of a total amount of the carboxylic acid compound having a furan ring and the alcohol having a furan ring in a total amount of the carboxylic acid component and the alcohol component (% by mol)
Y: Content of a total amount of the aliphatic carboxylic acid compound having 6 to 40 Carbon Atoms and the aliphatic alcohol Having 6 to 40 carbon atoms in a total amount of the carboxylic acid component and the alcohol component (% by mol)
Z: [Total amount of aliphatic carboxylic acid compound and the aliphatic alcohol each having 6 to 40 carbon atoms]/[Total amount of the carboxylic acid compound and the alcohol each having a furan ring]

It can be seen from the above results that Examples B1 to B22 are excellent in all of low-temperature fusing ability, storage property and durability, as compared to Comparative Examples B1 and B2 which contain an amorphous polyester not containing a furan ring.

Example C

C.1 Production Example 1 of Amorphous Polyesters

Resins A1, A4, A5, A6, A7, and A8

A 5-liter four-neck flask equipped with a nitrogen inlet tube, a dehydration tube equipped with a fractional distillation tube through which hot water at 98° C. was allowed to flow, a stirrer, and a thermocouple was charged with raw material monomers and an esterification catalyst, as listed in Table C1. The mixture was kept at 180° C. for 1 hour in a nitrogen atmosphere, and thereafter heated from 180° to 230° C. at a rate of 10° C./hr, and the heated mixture was then subjected to a polycondensation reaction at 230° C. for 10 hours. Further, the reaction mixture was subjected to a reaction at 10 kPa until a softening point as listed in Table C1 was reached, to provide each of amorphous polyesters.

C.2 Production Example 2 of Amorphous Polyester

Resin A2

A 5-liter four-neck flask equipped with a dehydration tube equipped with a nitrogen inlet tube, a stirrer, and a thermocouple was charged with raw material monomers and an esterification catalyst, as listed in Table C1. The mixture was subjected to a polycondensation reaction at 230° C. for 10 hours in a nitrogen atmosphere, and further subjected to a reaction at 230° C. and 8.0 kPa until a softening point as listed in Table C1 was reached, to provide an amorphous polyester.

C.3 Production Example 3 of Amorphous Polyester

Resin A3

A 5-liter four-neck flask equipped with a dehydration tube equipped with a fractional distillation tube through which hot water at 98° C. was allowed to flow, a stirrer, and a thermocouple was charged with raw material monomers other than trimellitic anhydride and an esterification catalyst, as listed in Table C1. The mixture was subjected to a polycondensation reaction at 230° C. for 10 hours in a nitrogen atmosphere, and further subjected to a reaction at 230° C. and 8.0 kPa for 1 hour. After cooling the reaction mixture to 200° C., trimellitic anhydride as listed in Table C1 was added thereto, and the mixture was subjected to a reaction at 200° C. and 10 kPa until a desired softening point was reached to provide a polyester. The mixture was subjected to a reaction until a softening point as listed in Table C1 was reached, to provide an amorphous polyester.

C.4 Production Example 1 of Crystalline Polyesters

Resins C1, C2, C3, C4, C6, and C7

A 5-liter four-neck flask equipped with a dehydration tube equipped with a nitrogen inlet tube, a stirrer, and a thermocouple was charged with raw material monomers and an esterification catalyst, as listed in Table C2. The mixture was subjected to a reaction at 160° C. over 5 hours in a nitrogen atmosphere, and then heated to 200° C. Further, the heated mixture was subjected to a reaction at 200° C. and 10.0 kPa until a softening point as listed in Table C2 was reached, to provide each of crystalline polyesters.

C.5 Production Example 2 of Crystalline Polyester

Resin C5

A 5-liter four-neck flask equipped with a dehydration tube equipped with a nitrogen inlet tube, a stirrer, and a thermocouple was charged with raw material monomers other than trimellitic anhydride and an esterification catalyst, as listed in Table C2. The mixture was subjected to a reaction at 160° C. over 5 hours in a nitrogen atmosphere, and then heated to 200° C. Further, the heated mixture was subjected to a reaction at 200° C. and 8.0 kPa for 1 hour. Furthermore, trimellitic anhydride as listed in Table C2 was added thereto, and the mixture was subjected to a reaction at 200° C. and 10.0 kPa until a softening point as listed in Table C2 was reached, to provide a crystalline polyester.

TABLE C1

| | Resin A1 Amount Used | | Resin A2 Amount Used | | Resin A3 Amount Used | | Resin A4 Amount Used | | Resin A5 Amount Used | | Resin A6 Amount Used | | Resin A7 Amount Used | | Resin A8 Amount Used | |
|---|---|---|---|---|---|---|---|---|---|---|---|---|---|---|---|---|
| | molar ratio | g | molar ratio | g | molar ratio | g | molar ratio | g | molar ratio | g | molar ratio | g | molar ratio | g | molar ratio | g |
| Raw Material Monomers | | | | | | | | | | | | | | | | |
| Alcohol Component | | | | | | | | | | | | | | | | |
| 1,2-Propanediol | 70 | 1,064 | — | — | 70 | 798 | 70 | 1,064 | 70 | 1,064 | 70 | 1,064 | 65 | 988 | 70 | 1,064 |
| 2,3-Butanediol | 30 | 540 | — | — | 30 | 405 | 30 | 540 | 30 | 540 | 30 | 540 | 25 | 450 | 30 | 540 |
| BPA-PO[1)] | — | — | 70 | 2,450 | — | — | — | — | — | — | — | — | — | — | — | — |
| BPA-EO[2)] | — | — | 30 | 975 | — | — | — | — | — | — | — | — | — | — | — | — |
| 5-Hydroxymethylfurfuryl Alcohol | — | — | — | — | — | — | — | — | — | — | — | — | 20 | 512 | — | — |
| Carboxylic Acid Component | | | | | | | | | | | | | | | | |
| Furan-2,5-Dicarboxylic Acid | 80 | 2,496 | 80 | 1,248 | 70 | 1,638 | — | — | — | — | 60 | 1,872 | 80 | 2,496 | — | — |
| Furan-2,4-Dicarboxylic Acid | — | — | — | — | — | — | 80 | 2,496 | — | — | — | — | — | — | — | — |
| Ethyl Furan-2,5-Dicarboxylate | — | — | — | — | — | — | — | — | 80 | 3,392 | — | — | — | — | — | — |
| Furan-2-Carboxylic Acid | — | — | — | — | — | — | — | — | — | — | 40 | 896 | — | — | — | — |
| Terephthalic Acid | — | — | — | — | — | — | — | — | — | — | — | — | — | — | 80 | 2,656 |
| Trimellitic Anhydride | — | — | — | — | 10 | 228 | — | — | — | — | — | — | — | — | — | — |
| Esterification Catalyst/Promoter | | | | | | | | | | | | | | | | |
| Tin(II) 2-Ethylhexanoate | — | 20.5 | — | 23.4 | — | 15.6 | — | 20.5 | — | 25.0 | — | 21.9 | — | 22.3 | — | 21.3 |
| Gallic Acid | — | — | — | — | — | — | — | — | — | — | — | — | — | — | — | 1.1 |

TABLE C1-continued

|  | Resin A1 Amount Used | | Resin A2 Amount Used | | Resin A3 Amount Used | | Resin A4 Amount Used | | Resin A5 Amount Used | | Resin A6 Amount Used | | Resin A7 Amount Used | | Resin A8 Amount Used | |
|---|---|---|---|---|---|---|---|---|---|---|---|---|---|---|---|---|
|  | molar ratio | g | molar ratio | g | molar ratio | g | molar ratio | g | molar ratio | g | molar ratio | g | molar ratio | g | molar ratio | g |
| Total Amount of Carboxylic Acid Compound Having Furan Ring and Alcohol Having Furan Ring [X][3] (% by mol) | 44.4 | | 44.4 | | 38.9 | | 44.4 | | 44.4 | | 50.0 | | 52.6 | | 0 | |
| Softening Point (° C.) | 106.6 | | 110.6 | | 128.3 | | 111.6 | | 109.0 | | 108.1 | | 109.4 | | 112.4 | |
| Highest Temperature of Endothermic Peak (° C.) | 66.5 | | 68.9 | | 70.6 | | 65.5 | | 62.9 | | 63.9 | | 66.2 | | 62.9 | |
| Softening Point/Highest Temperature of Endothermic Peak | 1.60 | | 1.61 | | 1.82 | | 1.70 | | 1.73 | | 1.69 | | 1.65 | | 1.79 | |
| Glass Transition Temperature (° C.) | 60.5 | | 62.1 | | 64.3 | | 58.8 | | 55.2 | | 56.4 | | 59.8 | | 57.6 | |
| Acid Value (mgKOH/g) | 9.4 | | 8.2 | | 13.9 | | 7.9 | | 0.2 | | 13.6 | | 18.5 | | 5.5 | |
| Hydroxyl Value (mgKOH/g) | 49.6 | | 52.6 | | 38.2 | | 47.4 | | 50.5 | | 45.1 | | 47.7 | | 44.9 | |
| Number-Average Molecular Weight | 1,500 | | 1,800 | | 3,200 | | 1,600 | | 1,700 | | 1,500 | | 1,800 | | 1,700 | |

[1] Polyoxypropylene(2.2)-2,2-bis(4-hydroxyphenyl)propane
[2] Polyoxyethylene(2.2)-2,2-bis(4-hydroxyphenyl)propane
[3] Content in a total amount of the carboxylic acid component and the alcohol component

TABLE C2

|  | Resin C1 Amount Used | | Resin C2 Amount Used | | Resin C3 Amount Used | | Resin C4 Amount Used | | Resin C5 Amount Used | | Resin C6 Amount Used | | Resin C7 Amount Used | |
|---|---|---|---|---|---|---|---|---|---|---|---|---|---|---|
|  | molar ratio | g | molar ratio | g | molar ratio | g | molar ratio | g | molar ratio | g | molar ratio | g | molar ratio | g |
| Raw Material Monomers | | | | | | | | | | | | | | |
| Alcohol Component | | | | | | | | | | | | | | |
| 1,6-Hexanediol | 100 | 2,360 | — | — | 100 | 1,770 | 100 | 2,360 | 100 | 2,360 | 100 | 2,360 | 100 | 2,360 |
| 1,4-Butanediol | — | — | 100 | 1,800 | — | — | — | — | — | — | — | — | — | — |
| Carboxylic Acid Component | | | | | | | | | | | | | | |
| Sebacic Acid | 100 | 4,040 | 100 | 4,040 | — | — | — | — | 80 | 3,232 | — | — | 80 | 3,232 |
| Fumaric Acid | — | — | — | — | 100 | 1,740 | — | — | — | — | — | — | — | — |
| Terephthalic Acid | — | — | — | — | — | — | 90 | 2,988 | — | — | — | — | — | — |
| Furan-2,5-Dicarboxylic Acid | — | — | — | — | — | — | — | — | — | — | 90 | 2,808 | 20 | 624 |
| Trimellitic Anhydride | — | — | — | — | — | — | — | — | 15 | 576 | — | — | — | — |
| Esterification Catalyst/Promoter | | | | | | | | | | | | | | |
| Tin(II) 2-Ethylhexanoate | — | 32.0 | — | 29.2 | — | 17.6 | — | 26.7 | — | 30.8 | — | 25.8 | — | 31.1 |
| Gallic Acid | — | — | — | — | — | — | — | — | — | 1.1 | — | — | — | — |
| Polymerization Inhibitor | | | | | | | | | | | | | | |
| tert-Butyl Catechol | — | — | — | — | — | 0.35 | — | — | — | — | — | — | — | — |
| Total Amount of Carboxylic Acid Compound Having Furan Ring and Alcohol | 0 | | 0 | | 0 | | 0 | | 0 | | 47.4 | | 10.0 | |

TABLE C2-continued

|  | Resin C1 Amount Used | | Resin C2 Amount Used | | Resin C3 Amount Used | | Resin C4 Amount Used | | Resin C5 Amount Used | | Resin C6 Amount Used | | Resin C7 Amount Used | |
| --- | --- | --- | --- | --- | --- | --- | --- | --- | --- | --- | --- | --- | --- | --- |
|  | molar ratio | g | molar ratio | g | molar ratio | g | molar ratio | g | molar ratio | g | molar ratio | g | molar ratio | g |
| Having Furan Ring [X][1] (% by mol) |  |  |  |  |  |  |  |  |  |  |  |  |  |  |
| Softening Point (° C.) | 64.3 | | 71.6 | | 110.2 | | 119.4 | | 78.7 | | 137.4 | | 65.5 | |
| Highest Temperature of Endothermic Peak [Melting Point] (° C.) | 68.3 | | 75.6 | | 113.5 | | 129.4 | | 70.6 | | 143.5 | | 67.7 | |
| Softening Point/Highest Temperature of Endothermic Peak | 0.94 | | 0.95 | | 0.97 | | 0.92 | | 1.1 | | 0.96 | | 0.97 | |

[1]Content in a total amount of the carboxylic acid component and the alcohol component

C.6 Examples C1 to C15 and Comparative Examples C1 and C2

One hundred parts by weight of a resin binder and resin binders as listed in Table C3, 5 parts by weight of a colorant "Regal 330R" (manufactured by Cabot Corporation, a carbon black), 2 parts by weight of a releasing agent "Mitsui Hi-Wax NP055" (manufactured by MITSUI CHEMICALS, INC., a polypropylene wax, melting point: 125° C.), and 1 part by weight of a negatively chargeable charge control agent "BONTRON E-81" (manufactured by Orient Chemical Co., Ltd.) were sufficiently mixed with a Henschel mixer, and thereafter the mixture was melt-kneaded with a unidirectional rotary twin-screw extruder at a roller rotational speed of 200 r/min and a heating temperature inside the roller of 80° C. The melt-kneaded product obtained was cooled and roughly pulverized, and thereafter pulverized with a jet mill, and a pulverized product was classified, to provide toner particles having a volume-median particle size ($D_{50}$) of 8 μm.

To 100 parts by weight of the resulting toner particles was added 1.0 part by weight of a hydrophobic silica "NAX-50" (manufactured by Nihon Aerosil Co., Ltd., a hydrophobic treatment agent: HMDS (hexamethyldisilazane), average particle size: about 30 nm), and the mixture was blended with a Henschel mixer, to provide each of the toners.

C.7 Example C16

The same procedures as in Example C1 were carried out except that 5 parts by weight of a charge control resin "FCA-701PT" (manufactured by FUJIKURA KASEI CO., LTD., a quaternary ammonium salt group-containing styrene-acrylic copolymer, softening point: 123° C.) was used together with the resin binders, the colorant, and the like, that 1 part by weight of a positively chargeable charge control agent "BONTRON E-84" (manufactured by Orient Chemical Co., Ltd.) was used in place of the negatively chargeable charge control agent, and that 1.0 part by weight of a hydrophobic silica "TG-C243" (manufactured by Cabot Corporation, average particle size: 100 nm, hydrophobic treatment agent: hexamethyldisilazane+octyltriethoxysilane) was used in place of "NAX-50" as an external additive, to provide a toner.

C.8 Examples C17 and C19

The same procedures as in Example C1 were carried out except that 5 parts by weight of a cyan pigment "Toner Cyan BG" (manufactured by Clariant, P. B. 15:3) was used in Example C17, and 6 parts by weight of a yellow pigment "Paliotol Yellow D1155" (manufactured by BASF, P. Y. 185) was used in Example C19, in place of the carbon black "Regal 330R" as a colorant, that 2 parts by weight of "HNP-9" (manufactured by Nippon Seiro, a paraffin wax, melting point: 80° C.) was used in place of "Mitsui Hi-Wax NP055" as a releasing agent, that 1 part by weight of "LR-147" (manufactured by Nippon Carlit, Ltd.) was used in place of "BONTRON E-81" (manufactured by Orient Chemical Co., Ltd.) as a negatively chargeable charge control agent, and that 1.0 part by weight of a hydrophobic silica "R-972" (manufactured by Nihon Aerosil Co., Ltd., average particle size: 16 nm, a hydrophobic treatment agent: dimethyldichlorosilane) was used in place of "NAX-50" as an external additive, to provide each toner.

C.9 Example C18

The same procedures as in Example C1 were carried out except that 5 parts by weight of a magenta pigment "Super Magenta R" (manufactured by DIC Corporation, P. R. 122) was used in place of the carbon black "Regal 330R" as a colorant, that 2 parts by weight of "HNP-9" (manufactured by Nippon Seiro, a paraffin wax, melting point: 80° C.) was used in place of "Mitsui Hi-Wax NP055" as a releasing agent, that 1 part by weight of "LR-297" (manufactured by Nippon Carlit, Ltd.) was used in place of "BONTRON E-81" (manufactured by Orient Chemical Co., Ltd.) as a negatively chargeable charge control agent, and that 1.0 part by weight of a hydrophobic silica "R-972" (manufactured by Nihon Aerosil Co., Ltd., average particle size: 16 nm, a hydrophobic treatment agent: dimethyldichlorosilane) was used in place of "NAX-50" as an external additive, to provide a toner.

C.10 Test Example C1

Low-Temperature Fusing Ability

The resulting toner was loaded on a copy machine "AR-505" (manufactured by Sharp Corporation), of which fuser was modified so that fusing could be carried out outside the machine, provided that the evaluation of Example C16 was made using a modified apparatus of nonmagnetic monocomponent development method printer "HL-2040" (manufactured by Brother Industries Ltd.), and a lowest fusing temperature was measured and the low-temperature fusing ability was evaluated, in the same manner as in Test Example A1. The results are shown in Table C3.

C.11 Test Example C2

Storage Property

Four grams of a toner was placed in a cylindrical container having a radius of 12 mm, and allowed to stand for 48 hours and 72 hours under environmental conditions of a temperature of 55° C. and relative humidity of 60%. After allowing the toner to stand, the toner was taken out of the container, and the extent of generation of toner aggregation was visually observed, and the storage property was evaluated in accordance with the following evaluation criteria. The results are shown in Table C3.

[Evaluation Criteria]
A: The aggregation is not found at all even after 48 hours and 72 hours.
B: Although the aggregation is not found after 48 hours, the aggregation is found after 72 hours.
C: The aggregation is found within 48 hours.

The present invention relates any one of to the following:

<1>
A resin binder for use in a toner, containing an amorphous polyester having a furan ring.

<2>
The resin binder for use in a toner according to <1>, wherein the amorphous polyester is obtained by polycondensing a carboxylic acid component and an alcohol component, using, as a raw material monomer, at least a carboxylic acid component containing a carboxylic acid compound having a furan ring and/or an alcohol component containing an alcohol having a furan ring.

<3>
The resin binder for use in a toner according to <2>, wherein a total amount of the carboxylic acid compound having a furan ring and the alcohol having a furan ring is preferably from 10 to 100% by mol, more preferably from 10 to 95% by mol, even more preferably from 20 to 90% by mol, still even more preferably from 20 to 80% by mol, still even

TABLE C3

|  | Amorphous Polyester | | Crystalline Polyester | | | | | Charge | Charge | | Low Temperature Fusing Ability | |
|---|---|---|---|---|---|---|---|---|---|---|---|---|
|  | Kind | X | Parts by Wt. | Kind | X | Parts by Wt. | Colorant | Releasing Agent | Control Agent | Control Resin | External Additive | [Lowest Fusing Temperature] | Storage Property |
| Ex. C1 | Resin A1 | 44.4 | 80 | Resin C1 | 0 | 20 | Black | NP055 | E-81 | None | NAX-50 | 100° C. | A |
| Ex. C2 | Resin A2 | 44.4 | 80 | Resin C1 | 0 | 20 | Black | NP055 | E-81 | None | NAX-50 | 125° C. | A |
| Ex. C3 | Resin A1 | 44.4 | 80 | Resin C2 | 0 | 20 | Black | NP055 | E-81 | None | NAX-50 | 105° C. | A |
| Ex. C4 | Resin A1 | 44.4 | 80 | Resin C3 | 0 | 20 | Black | NP055 | E-81 | None | NAX-50 | 110° C. | A |
| Ex. C5 | Resin A1 | 44.4 | 80 | Resin C4 | 0 | 20 | Black | NP055 | E-81 | None | NAX-50 | 120° C. | A |
| Ex. C6 | Resin A1 | 44.4 | 80 | Resin C5 | 0 | 20 | Black | NP055 | E-81 | None | NAX-50 | 125° C. | A |
| Ex. C7 | Resin A1 | 44.4 | 80 | Resin C6 | 47.4 | 20 | Black | NP055 | E-81 | None | NAX-50 | 135° C. | A |
| Ex. C8 | Resin A1 | 44.4 | 80 | Resin C7 | 10 | 20 | Black | NP055 | E-81 | None | NAX-50 | 105° C. | A |
| Ex. C9 | Resin A1 | 44.4 | 70 | Resin C1 | 0 | 30 | Black | NP055 | E-81 | None | NAX-50 | 90° C. | B |
| Ex. C10 | Resin A1 | 44.4 | 90 | Resin C1 | 0 | 10 | Black | NP055 | E-81 | None | NAX-50 | 110° C. | A |
| Ex. C11 | Resin A3 | 38.9 | 80 | Resin C1 | 0 | 20 | Black | NP055 | E-81 | None | NAX-50 | 130° C. | A |
| Ex. C12 | Resin A4 | 44.4 | 80 | Resin C1 | 0 | 20 | Black | NP055 | E-81 | None | NAX-50 | 100° C. | A |
| Ex. C13 | Resin A5 | 44.4 | 80 | Resin C1 | 0 | 20 | Black | NP055 | E-81 | None | NAX-50 | 100° C. | A |
| Ex. C14 | Resin A6 | 50.0 | 80 | Resin C1 | 0 | 20 | Black | NP055 | E-81 | None | NAX-50 | 105° C. | A |
| Ex. C15 | Resin A7 | 52.6 | 80 | Resin C1 | 0 | 20 | Black | NP055 | E-81 | None | NAX-50 | 100° C. | A |
| Ex. C16 | Resin A1 | 44.4 | 80 | Resin C1 | 0 | 20 | Black | NP055 | E-84 | FCA-701PT | TG-C243 | 105° C. | A |
| Ex. C17 | Resin A1 | 44.4 | 80 | Resin C1 | 0 | 20 | Cyan | HNP-9 | LR-147 | None | R-972 | 100° C. | A |
| Ex. C18 | Resin A1 | 44.4 | 80 | Resin C1 | 0 | 20 | Magenta | HNP-9 | LR-297 | None | R-972 | 100° C. | A |
| Ex. C19 | Resin A1 | 44.4 | 80 | Resin C1 | 0 | 20 | Yellow | HNP-9 | LR-147 | None | R-972 | 100° C. | A |
| Comp. Ex. C1 | Resin A8 | 0 | 80 | Resin C6 | 47.4 | 20 | Black | NP055 | E-81 | None | NAX-50 | 135° C. | C |
| Comp. Ex. C2 | Resin A8 | 0 | 80 | Resin C1 | 0 | 20 | Black | NP055 | E-81 | None | NAX-50 | 120° C. | C |

Note)
X: Content of a total amount of the carboxylic acid compound having a furan ring and the alcohol having a furan ring in a total amount of the carboxylic acid component and the alcohol component (% by mol)

It can be seen from the above results that Examples C1 to C19 are excellent in both low-temperature fusing ability and storage property, as compared to Comparative Examples C1 and C2 containing an amorphous polyester obtained without using a compound having a furan ring. In addition, it can be seen from the results of Comparative Example C2 that storage property is not improved even if the compound having a furan ring is used in a crystalline polyester, unless the compound is used in the amorphous polyester.

The resin binder for use in a toner of the present invention can be suitable used for a toner usable in development of latent images formed in electrophotography, an electrostatic recording method, an electrostatic printing method, or the like, more preferably from 30 to 70% by mol, still even more preferably from 40 to 60% by mol, and still even more preferably from 40 to 50% by mol, of the total amount of the carboxylic acid component and the alcohol component.

<4>
The resin binder for use in a toner according to <2> or <3>, wherein the carboxylic acid compound having a furan ring is contained in an amount of preferably from 10 to 100% by mol, more preferably from 20 to 100% by mol, even more preferably from 30 to 100% by mol, still even more preferably from 60 to 100% by mol, still even more preferably from 80 to 100% by mol, still even more preferably from 90 to 100% by mol, and still even more preferably substantially 100%, of the carboxylic acid component.

<5>

The resin binder for use in a toner according to any one of <2> to <4>, wherein the alcohol having a furan ring is contained in an amount of preferably from 10 to 100% by mol, more preferably from 10 to 90% by mol, more preferably from 20 to 90% by mol, even more preferably from 20 to 80% by mol, and still even more preferably from 20 to 40% by mol, of the alcohol component.

<6>

The resin binder for use in a toner according to any one of <1> to <5>, wherein the alcohol component contains an aliphatic diol having a hydroxyl group bonded to a secondary carbon atom.

<7>

The resin binder for use in a toner according to <6>, wherein the aliphatic diol having a hydroxyl group bonded to a secondary carbon atom is contained in an amount of preferably from 10 to 100% by mol, more preferably from 20 to 100% by mol, even more preferably from 30 to 100% by mol, still even more preferably from 50 to 100% by mol, still even more preferably from 60 to 100% by mol, still even more preferably from 80 to 100% by mol, still even more preferably from 90 to 100% by mol, and still even more preferably substantially 100% by mol, of the alcohol component other than the alcohol having a furan ring.

<8>

The resin binder for use in a toner according to any one of <1> to <7>, wherein the amorphous polyester is obtained by polycondensing a carboxylic acid component and an alcohol component, wherein at least one of the carboxylic acid component and the alcohol component is a carboxylic acid component containing an aliphatic carboxylic acid compound having 6 to 40 carbon atoms and/or an alcohol component containing an aliphatic alcohol having 6 to 40 carbon atoms.

<9>

The resin binder for use in a toner according to <8>, wherein the aliphatic carboxylic acid compound having 6 to 40 carbon atoms is a linear or branched monocarboxylic or dicarboxylic acid compound, and wherein the aliphatic carboxylic acid compound has the number of carbon atoms of preferably 6 or more, more preferably 8 or more, and even more preferably 12 or more, and preferably 40 or less, more preferably 36 or less, even more preferably 26 or less, still even more preferably 22 or less, and still even more preferably 16 or less.

<10>

The resin binder for use in a toner according to <8>, wherein the aliphatic carboxylic acid compound having 6 to 40 carbon atoms has the number of carbon atoms of from 6 to 40, preferably from 8 to 36, more preferably from 12 to 26, even preferably from 12 to 22, and still even more preferably from 12 to 16.

<11>

The resin binder for use in a toner according to any one of <8> to <10>, wherein the aliphatic alcohol having 6 to 40 carbon atoms is a linear or branched, mono-alcohol or di-alcohol, and the aliphatic alcohol has the number of carbon atoms of preferably 6 or more, more preferably 8 or more, and even more preferably 12 or more, and preferably 40 or less, more preferably 36 or less, even more preferably 26 or less, still even more preferably 22 or less, and still even more preferably 16 or less.

<12>

The resin binder for use in a toner according to any one of <8> to <10>, wherein the aliphatic alcohol having 6 to 40 carbon atoms has the number of carbon atoms of from 6 to 40, preferably from 8 to 36, more preferably from 12 to 26, even preferably from 12 to 22, and still even more preferably from 12 to 16.

<13>

The resin binder for use in a toner according to any one of <8> to <12>, wherein the aliphatic carboxylic acid compound having 6 to 40 carbon atoms is contained in an amount of preferably 2% by mol or more, more preferably 4% by mol or more, even more preferably 6% by mol or more, and still even more preferably 10% by mol or more, and preferably 75% by mol or less, more preferably 60% by mol or less, even more preferably 50% by mol or less, still even more preferably 40% by mol or less, and still even more preferably 30% by mol or less.

<14>

The resin binder for use in a toner according to any one of <8> to <12>, wherein the aliphatic carboxylic acid compound having 6 to 40 carbon atoms is contained in an amount of preferably from 2 to 75% by mol, more preferably from 4 to 60% by mol, even more preferably from 6 to 50% by mol, still even more preferably from 6 to 40% by mol, and still even more preferably from 10 to 30% by mol.

<15>

The resin binder for use in a toner according to any one of <8> to <14>, wherein the aliphatic alcohol having 6 to 40 carbon atoms is contained in an amount of preferably 2% by mol or more, more preferably 4% by mol or more, even more preferably 6% by mol or more, and still even more preferably 10% by mol or more, and preferably 75% by mol or less, more preferably 60% by mol or less, even more preferably 50% by mol or less, still even more preferably 40% by mol or less, and still even more preferably 30% by mol or less.

<16>

The resin binder for use in a toner according to any one of <8> to <14>, wherein the aliphatic alcohol having 6 to 40 carbon atoms is contained in an amount of preferably from 2 to 75% by mol, more preferably from 4 to 60% by mol, even more preferably from 6 to 50% by mol, still even more preferably from 6 to 40% by mol, and still even more preferably from 10 to 30% by mol.

<17>

The resin binder for use in a toner according to any one of <8> to <16>, wherein the alcohol component contains an aliphatic diol having 3 to 5 carbon atoms, having a hydroxyl group bonded to a secondary carbon atom.

<18>

The resin binder for use in a toner according to any one of <8> to <17>, wherein a total amount of the aliphatic carboxylic acid compound having 6 to 40 carbon atoms and the aliphatic alcohol having 6 to 40 carbon atoms is from 1 to 35% by mol, of the total amount of the carboxylic acid component and the alcohol component.

<19>

The resin binder for use in a toner according to any one of <8> to <18>, wherein the aliphatic carboxylic acid compound having 6 to 40 carbon atoms is an alkyl(8 to 22 carbon atoms) succinic acid and/or an alkenyl(8 to 22 carbon atoms)succinic acid.

<20>

The resin binder for use in a toner according to any one of <1> to <19>, further containing a crystalline polyester obtained by polycondensing an alcohol component containing an α,ω-aliphatic diol and a carboxylic acid component.

<21>

The resin binder for use in a toner according to any one of <1> to <20>, wherein the weight ratio of the crystalline polyester to the amorphous polyester, i.e. crystalline polyester/amorphous polyester, is preferably from 40/60 to 5/95, more preferably from 30/70 to 10/90, and even more preferably from 25/75 to 15/85.
<22>
The resin binder for use in a toner according to any one of <1> to <21>, wherein the amorphous polyester has a softening point of preferably from 80° to 180° C., and more preferably from 90° to 160° C.
<23>
The resin binder for use in a toner according to any one of <2> to <22>, wherein the carboxylic acid compound having a furan ring is at least one member selected from the group consisting of furan dicarboxylic acid compounds, furan carboxylic acid compounds, and the hydroxyfuran carboxylic acid compounds.
<24>
The resin binder for use in a toner according to any one of <2> to <23>, wherein the alcohol having a furan ring is at least one member selected from the group consisting of furan di-alcohols, hydroxymethyl furfuryl alcohols, and furfuryl alcohol.
<25>
The resin binder for use in a toner according to any one of <8> to <24>, wherein the molar ratio of [total amount of the aliphatic carboxylic acid compound having 6 to 40 carbon atoms and the aliphatic alcohol having 6 to 40 carbon atoms]/[total amount of the carboxylic acid compound having furan ring and the alcohol having furan ring] is preferably 0.03 or more, more preferably 0.05 or more, even more preferably 0.1 or more, and still even more preferably 0.2 or more, and preferably 5 or less, more preferably 3 or less, even more preferably 2 or less, and still even more preferably 1 or less.
<26>
The resin binder for use in a toner according to any one of <8> to <25>, wherein the molar ratio of [total amount of the aliphatic carboxylic acid compound having 6 to 40 carbon atoms and the aliphatic alcohol having 6 to 40 carbon atoms]/[total amount of the carboxylic acid compound having furan ring and the alcohol having furan ring] is preferably from 0.03 to 5, more preferably from 0.05 to 5, even more preferably from 0.1 to 3, still even more preferably from 0.1 to 2, and still even more preferably from 0.2 to 1.
<27>
A toner for electrophotography, containing the resin binder as defined in any one of <1> to <26>.

The invention claimed is:

1. A toner for electrophotography, comprising a resin binder wherein said resin binder comprises an amorphous polyester having a furan ring, wherein said amorphous polyester has a softening point of from 80° to 180° C.

2. The toner according to claim 1, wherein the amorphous polyester is obtained by polycondensing a carboxylic acid component and an alcohol component, using, as a raw material monomer, at least a carboxylic acid component comprising a carboxylic acid compound having a furan ring and/or an alcohol component comprising an alcohol having a furan ring.

3. The toner according to claim 2, wherein the carboxylic acid compound having a furan ring and the alcohol having a furan ring are present in a total amount of from 10 to 100% by mol, of the total amount of the carboxylic acid component and the alcohol component.

4. The toner according to claim 2, wherein the alcohol component comprises an aliphatic diol having a hydroxyl group bonded to a secondary carbon atom.

5. The toner according to claim 1, wherein the amorphous polyester is obtained by polycondensing a carboxylic acid component and an alcohol component, wherein at least one of the carboxylic acid component and the alcohol component is a carboxylic acid component comprising at least one of an aliphatic carboxylic acid compound having 6 to 40 carbon atoms and an alcohol component comprising an aliphatic alcohol having 6 to 40 carbon atoms.

6. The toner according to claim 5, wherein the alcohol component comprises an aliphatic diol having 3 to 5 carbon atoms, having a hydroxyl group bonded to a secondary carbon atom.

7. The toner according to claim 5, wherein the aliphatic carboxylic acid compound having 6 to 40 carbon atoms and the aliphatic alcohol having 6 to 40 carbon atoms are present in a total amount of from 1 to 35% by mol, of the total amount of the carboxylic acid component and the alcohol component.

8. The toner according to claim 5, wherein the aliphatic carboxylic acid compound having 6 to 40 carbon atoms comprises at least one of an alkyl succinic acid and an alkenyl succinic acid, wherein the alkyl has 8 to 22 carbon atoms and the alkenyl has 8 to 22 carbon atoms.

9. The toner according to claim 1, wherein said resin binder further comprises a crystalline polyester obtained by polycondensing an alcohol component comprising an α,ω-aliphatic diol and a carboxylic acid component.

10. The toner according to claim 2, wherein the carboxylic acid compound having a furan ring is at least one member selected from the group consisting of a furan dicarboxylic acid compound, a furan carboxylic acid compound, and a hydroxyfuran carboxylic acid compound.

11. The toner according to claim 2, wherein the alcohol having a furan ring is at least one member selected from the group consisting of a furan di-alcohol, a hydroxymethylfurfuryl alcohol, and furfuryl alcohol.

12. The toner according to claim 5, wherein a molar ratio of [a total amount of the aliphatic carboxylic acid compound having 6 to 40 carbon atoms and the aliphatic alcohol having 6 to 40 carbon atoms]/[a total amount of the carboxylic acid compound having a furan ring and the alcohol having a furan ring] is from 0.03 to 5.

13. The toner according to claim 2, wherein the carboxylic acid compound having a furan ring is present in an amount of from 10 to 100% by mol of the carboxylic acid component.

14. The toner according to claim 2, wherein the alcohol having a furan ring is present in an amount of from 10 to 100% by mol of the alcohol component.

15. The toner according to claim 4, wherein the aliphatic diol having a hydroxyl group bonded to a secondary carbon atom is present in an amount of from 10 to 100% by mol of the alcohol component other than the alcohol having a furan ring.

16. The toner according to claim 9, wherein a weight ratio of the crystalline polyester to the amorphous polyester is from 40/60 to 5/95.

17. The toner according to claim 1, wherein the amorphous polyester having a furan ring has a softening point of from 90° to 160° C.

18. The toner according to claim 1, wherein the amorphous polyester having a furan ring has a number-average molecular weight of from 500 to 10,000.

19. The toner according to claim 18, wherein the number-average molecular weight is from 500 to 5,000.

20. The toner according to claim 17, wherein the number-average molecular weight is from 500 to 5,000.

* * * * *